United States Patent
Hager et al.

(10) Patent No.: US 10,850,392 B2
(45) Date of Patent: Dec. 1, 2020

(54) SYSTEM AND METHOD FOR COMPUTING GRASPS FOR A ROBOTIC HAND WITH A PALM

(75) Inventors: Gregory D. Hager, Baltimore, MD (US); Eliot Leonard Wegbreit, Palo Alto, CA (US)

(73) Assignee: Strider Labs, Inc., Jackson, WY (US)

( * ) Notice: Subject to any disclaimer, the term of this patent is extended or adjusted under 35 U.S.C. 154(b) by 1525 days.

(21) Appl. No.: 11/104,822

(22) Filed: Apr. 12, 2005

(65) Prior Publication Data

US 2006/0012198 A1 Jan. 19, 2006

Related U.S. Application Data

(60) Provisional application No. 60/561,656, filed on Apr. 12, 2004.

(51) Int. Cl.
| | |
|---|---|
| *B66C 1/00* | (2006.01) |
| *B25J 9/16* | (2006.01) |
| *B25J 15/00* | (2006.01) |

(52) U.S. Cl.
CPC ......... *B25J 9/1612* (2013.01); *B25J 15/0009* (2013.01)

(58) Field of Classification Search
USPC ........ 700/260, 261, 245, 262; 901/9, 33, 34, 901/30, 31; 623/64, 65; 703/2; 702/182, 127; 294/106, 110.1; 382/108, 382/153, 154
See application file for complete search history.

(56) References Cited

U.S. PATENT DOCUMENTS

| | | |
|---|---|---|
| 3,694,021 A | 9/1972 | Mullen |
| 3,927,424 A | 12/1975 | Itoh |
| (Continued) | | |

FOREIGN PATENT DOCUMENTS

| | | | | |
|---|---|---|---|---|
| JP | 09-150384 | * | 6/1997 | .............. B25J 15/00 |
| JP | 2004050378 A | | 2/2004 | |
| (Continued) | | | | |

OTHER PUBLICATIONS

Toth, "Stable Object Grasping with Dextrous Hand in Three-Dimension" Periodica Polytechnica Ser. El. Eng. vol. 43, No. 3, 1999, p. 207-214.*

(Continued)

*Primary Examiner* — Peter D Nolan
*Assistant Examiner* — Ce Li Li
(74) *Attorney, Agent, or Firm* — Gard & Kaslow LLP

(57) ABSTRACT

A system and method for automatically computing desirable palm grasp configurations of an object by a robotic hand is disclosed. A description of the object's surface is obtained. A grasp configuration of a robotic hand comprising a palm and one or more fingers is selected, which specifies a hand configuration and joint variables of the hand, and a plurality of contact points on the object's surface for the palm and fingers. The coefficient of friction at each of the contact points is determined, and a description of one or more external wrenches to which may apply to the object is acquired. The ability of the robotic hand to hold the object against the external wrenches in the selected configuration is then computed. In some embodiments, a plurality of grasp configurations may be compared to determine which are the most desirable. In other embodiments, the space of hand configurations, or the smaller space of palm contact configurations, may be searched to find the most desirable grasp configurations.

38 Claims, 5 Drawing Sheets

(56) References Cited

U.S. PATENT DOCUMENTS

| | | | |
|---|---|---|---|
| 4,364,593 | A | 12/1982 | Maeda |
| 4,834,443 | A | 5/1989 | Crowder et al. |
| 4,834,761 | A | 5/1989 | Walters |
| 4,921,293 | A | 5/1990 | Ruoff et al. |
| 4,980,626 | A | 12/1990 | Hess et al. |
| 4,984,951 | A | 1/1991 | Jameson |
| 5,004,391 | A | 4/1991 | Burdea |
| 5,062,673 | A | 11/1991 | Mimura |
| 5,080,681 | A | 1/1992 | Erb |
| 5,080,682 | A | 1/1992 | Schectman |
| 5,200,679 | A | 4/1993 | Graham |
| 5,325,468 | A * | 6/1994 | Terasaki et al. ............ 700/262 |
| 5,328,224 | A | 7/1994 | Jacobsen et al. |
| 5,378,033 | A | 1/1995 | Guo et al. |
| 5,570,920 | A | 11/1996 | Crisman et al. |
| 5,647,723 | A | 7/1997 | Rush |
| 5,762,390 | A * | 6/1998 | Gosselin et al. ............ 294/106 |
| 5,967,580 | A | 10/1999 | Rosheim |
| 6,244,644 | B1 | 6/2001 | Lovchik et al. |
| 6,247,738 | B1 | 6/2001 | Winkel et al. |
| 6,379,393 | B1 | 4/2002 | Mavroidis et al. |
| 6,392,647 | B1 * | 5/2002 | Migdal et al. ............... 345/423 |
| 6,505,870 | B1 | 1/2003 | Laliberteet et al. |
| 6,585,668 | B2 | 7/2003 | Nissim |
| 6,817,641 | B1 | 11/2004 | Singleton, Jr. |
| 2001/0028174 | A1 * | 10/2001 | Matsuda et al. ............ 294/106 |
| 2004/0054424 | A1 * | 3/2004 | Matsuda ...................... 623/64 |
| 2004/0103740 | A1 | 6/2004 | Townsend et al. |

FOREIGN PATENT DOCUMENTS

| | | |
|---|---|---|
| JP | 2004106115 A | 4/2004 |
| JP | 2004130405 A | 4/2004 |
| JP | 2004181610 A | 7/2004 |

OTHER PUBLICATIONS

☐☐Miller, "Examples of 3D Grasp Quality Computations" IEEE (May 1999), p. 1240-1246.*

Borst et al., "A Fast and Robust Grasp Planner for Arbitrary 3D Objects" IEEE (May 1999). p. 1890-1896.*

Li et al., "A review of modeling of soft-contact fingers and stiffness control for dextrous manipulation in robotics" IEEE (May 21-26, 2001), p. 3055-3060.*

Miller, "Automatic Grasp Planning Using Shape Primitives", IEEE International Conference on Robotics and Automation, vol. 2, Sep. 2003, pp. 1824-1829.*

Bajcsy, "Image Understanding at the GRASP Laboratory" Department of Computer & Information Science Technical Reports, 1990, p. 1-10.*

Gourret, "Simulation of Object and Human Skin Deformations in a Grasping Task", International Conference on Computer Graphics and Interactive Techniques: Proceedings of the 16th annual conference on Computer graphics and interactive techniques; 1989, pp. 1-18.*

Ferrari, "Planning Optimal Grasps" IEEE International Conference on Robotics and Automation, May 1992, pp. 2290-2295.*

Han, "Grasp Analysis as Linear Matrix Inequality Problems" IEEE Transactions on Robotics and Automation, 2001, pp. 100-111.*

Bendiksen et al., "A Vision-Based Grasping System for Unfamiliar Planar Objects" IEEE 1994, pp. 2844-2849.*

Miller et al., "GraspIt!: A Versatile Simulator for Grasp Analysis" in Proc. of the ASME Dynamic Systems and Control Division, 2000, pp. 1251-1258.*

Chinellato, Eris, et al. "Ranking planar grasp configurations for a three-finger hand." Robotics and Automation, 2003. Proceedings. ICRA'03. IEEE International Conference on. vol. 1. IEEE, 2003, pp. 1133-1138.*

"The Shadow Dextrous Hand," Shadow Robot Company, May 29, 2002, located at http://www.shadow.org.uk/products/newhand.shtml.

"Robot Hand for the Disabled," BBC News, Aug. 7, 2002, located at http://news.bbc.co.uk/1/hi/health/2178226.stm.

Fukaya, N. et al., "Design of the TUAT /Karlsrube Humanoid Hand," Proceedings of the 2000 IEEE/RSJ International Conference on Intelligent Robots and Systems, 2000, IEEE.

"LEGOTIC Self-Adaptative Hand," located at http://mapage.noos.fr/chrismaker/hand.htm, visited Feb. 10, 2005.

* cited by examiner

SYSTEM AND METHOD FOR COMPUTING GRASPS FOR A ROBOTIC HAND WITH A PALM

CROSS-REFERENCE TO RELATED APPLICATIONS

This application claims the benefit of U.S. Provisional Patent Application Ser. No. 60/561,656, filed Apr. 12, 2004, entitled "System for Computing Desirable Grasps of Objects with Generally Shaped Surfaces," which is incorporated herein by reference in its entirety.

BACKGROUND OF THE INVENTION

Field of the Invention

The present invention relates generally to the field of robotics and, in particular, to the grasping of objects by a robotic hand.

Description of the Prior Art

Robots used in industrial environments have end effectors designed specifically for the parts to be grasped. The configuration of the end effector to be used to grasp a particular part is pre-planned and is programmed into the robot. That configuration is used whenever that part is grasped. This is ideal if a single part type is to be grasped for the entire duration of a long production run.

If a robot is to handle different part types, a turret with multiple end effectors or a tool changer is typically employed to accommodate the variation. A specific end effector and configuration is associated with each different part type and used when that part is to be grasped. The configurations are all pre-planned and the robot is programmed to select the appropriate configuration as required. This is a workable solution if the number of part types is small.

In contrast, if a robot is to be used in an unstructured environment, it must be able to grasp a wide variety of objects. To do so, two problems must be solved. First, an end effector that can securely grasp objects differing considerably in size, shape and weight is required. Second, the robot will not have previously encountered every object, and will not have a pre-planned configuration to be used for grasping each object. Hence, the robot will require the ability to plan grasps for such objects.

End effectors that are able to adapt to an object to be grasped are generally referred to as "robotic hands." There are many designs for such robotic hands. Recent patents disclosing robotic hands include U.S. Pat. Nos. 5,437,490, 5,447,403, 6,244,644 and 6,517,132.

To grasp an object for which there is no pre-planned hand configuration, the robot must be able to compute a plan when it encounters the object. To do so, the robot must first determine the shape of the object, then plan how the object should be grasped, and finally command the hand to grasp the object. A plan of how the object should be grasped includes the hand configuration at the point of the grasp, as well as the trajectory of the arm to bring the base of the hand to the required configuration. This invention is concerned with computing a desirable hand configuration for grasping general three-dimensional objects.

We refer to a hand configuration in which the hand grasps an object as a "grasp configuration," the process of automatically computing a desirable grasp configuration as "grasp planning," and the system that does so as a "grasp planner." A desirable grasp configuration is one in which the hand applies minimal force to the object, yet restrains it securely against external forces or torques. We refer to a generalized force, torque, or a combination of these as a "wrench". Thus, a grasp planner generally must include a means for computing the points of contact of the hand on an object, a means for computing the forces and torques necessary to restrain the object against one or more external wrenches, a method for assessing the desirability of the grasp based on the computed forces and torques, and an algorithm for searching among all possible points of contacts to find the most desirable grasp configuration.

Broadly speaking, grasps can be divided into two types, "precision grasps" and "palm grasps". A precision grasp is executed between the terminal digit pads of the thumb and fingers; it is used when the hand is required to perform delicate handling or manipulation. A palm grasp is executed between the surfaces of the fingers/thumb and the palm; it is used when a secure grasp is essential. Palm grasps are also sometimes referred to as 'power grasps' and sometimes as 'enveloping grasps.'

In many circumstances, the function of the robotic hand is mainly to securely grasp an object; movement or manipulation of the object is performed by an arm after the object has been securely grasped. In such circumstances a palm grasp is preferred. When the object is large or heavy, it is often the case that only a palm grasp can provide sufficient force to secure the object against the force of gravity. Consider grasping a large frying pan by its handle; it is almost impossible to hold it up with a precision grasp. Similarly, when other large forces may occur, it is often the case that only a palm grasp can provide sufficient force to secure the object. As another example, consider grasping a handle of a hammer so it can be swung to drive a nail. A precision grasp again provides insufficient restraining force in this situation and therefore cannot be used successfully to perform the task. In both instances a palm grasp is essential. Hence, it is useful to compute desirable palm grasps.

The computation of desirable palm grasps has not been addressed previously. Most research has been devoted to computing precision grasps that use only the fingers of a robotic hand. A survey of robotic grasping may be found in Bicchi and Kumar, "Robotic Grasping and Contact: A Review, *IEEE International Conference on Robotics and Automation (ICRA)*, 2000, pp. 348-353. Several somewhat separate directions of research may be distinguished.

One area of work is related to the problem of computing the contact forces required to restrain an object given a specified set of contact locations. Choosing the optimal contact forces to restrain an object is sometimes referred to as the "force optimization problem". An early paper in this field is Kerr and Roth, "Analysis of Multifingered Hands", *The International Journal of Robotic Research*, Vol. 4, No. 4, Winter 1986, pp 3-17. In this paper the force optimization problem was considered as a linear programming problem. In a subsequent paper, Cheng and Orin, "Efficient Algorithms for Optimal Force Distribution—The Compact Dual LP Method", *IEEE Trans. on Robotics and Automation*, Vol. 6, No. 2, April 1990, pp 178-187, the problem was formulated as a dual linear programming problem.

Another paper, Buss, Hashimoto, and Moore, "Dextrous hand grasping force optimization," *IEEE Trans. Robotics and Automation*, vol. 12, pp. 406-418, June 1996, observed that the friction force limit constraints and force balancing constraints are equivalent to the positive definiteness of a certain matrix subject to linear constraints. Based on this observation, this paper formulated the task of grasping force optimization as an optimization problem on the smooth manifold of linearly constrained positive definite matrices, for which there are known globally exponentially convergent solutions via gradient flows. Subsequently, Lobo, Vandenberghe, Boyd, and Lebret, "Applications of second-order cone programming," *Linear Algebra and Its Applications, Special Issue on Linear Algebra in Control, Signals and Image Processing*, vol. 284, pp. 193-228, November 1998, built on the work of Buss et al. and showed how the problem could be formulated as a second-order cone problem (SOCP). Another paper along these lines was Han, Trinkle, and Li, "Grasp analysis as linear matrix inequality problems," *IEEE Trans. on Robotics and Automation*, vol. 16, pp. 663-674, December 2000. This paper formulated the problem as a semi-definite programming problem involving linear matrix inequalities, to which it applied associated solvers.

In summary, these papers show that if the contact points are given, the external wrench is given, and the force to be minimized can be expressed as a suitable function, the various techniques described may be used to compute the optimal forces to be applied to restrain an object against the external wrench.

Restraining an object against a given external wrench is only one of several possible objectives of a desirable grasp. Various papers in the literature have considered various other external wrenches and developed quality measures based on the ability to resist those external wrenches. The set of possible external wrenches is sometimes referred to as the "wrench space" and the set of possible external wrenches that may be encountered in a particular task is sometimes referred to as the "task wrench space." Li and Sastry, "Task-Oriented Optimal Grasping by Multifingered Robot Hands", *IEEE Journal of Robotics and Automation "*, Vol. 4, No. 1, February 1988, pp 32-44, models the task wrench space by a 'task ellipsoid' and defines an optimality criterion based on the ability of the grasp to resist the wrenches in the task ellipsoid.

Several papers have developed the concept of resisting a completely arbitrary external wrench. These papers include Kirkpatrick, Mishra, and Yap, "Quantitative Steinitz's theorems with applications to multifingered grasping," *Proc. of the 20th ACM Symposium on Theory of Computing*, pp 341-351, 1990, and Ferrari and Canny, "Planning Optimal Grasps," *Proceedings of the 1992 IEEE International Conference on Robotics and Automation*, Nice, France, May 1992, pp 2290-2295. Another approach is taken by Borst, Fischer and Hirzinger, "Grasp Planning: How to Choose a Suitable Task Wrench Space", *IEEE International Conference on Robotics and Automation (ICRA)*, New Orleans, Apr. 26-May 1, 2004, pp 319-325. This approach takes the set of wrenches to be those that can be applied at the boundary of the object and uses this in a grasp quality measure.

In summary, the wrenches to be resisted by a desirable grasp have been characterized in several different ways. None of these characterizations is clearly superior to all the others. In some cases, the application may dictate the choice.

We next consider prior art concerned with searching for desirable grasps. There are several well-known methods for finding good grasps for the case where the object has a polyhedral shape. Three such methods may be found in Nguyen, "Constructing Force-Closure Grasps", *The International Journal of Robotic Research*, Vol. 7, No. 3, June 1988, pp 3-16, Pollard and Perez, "Grasp Stability and Feasibility for an Arm with an Articulated Hand", *IEEE Conference on Robotics and Automation (ICRA)*, 1990, pp 1581-1585, and Ponce, Sullivan, Sudsang, Boissonnat, and Merlet, "On Computing Four-Finger Equilibrium and Force-Closure Grasps of Polyhedral Objects", *Int. Journal of Robotics Research*, Vol. 16, No. 1, pp. 11-35, 1997. These methods depend on the object having only a small number of flat faces, so they do not extend directly to arbitrary objects with curved surfaces.

One system for planning grasps of arbitrary objects using only fingers is described by Miller et al., "Automatic Grasp Planning Using Shape Primitives", *IEEE International Conference on Robotics and Automation (ICRA)*, 2003. In this approach, surfaces are modeled as polyhedral meshes. Because the meshes are of high resolution and the facets are small, curved objects can be modeled reasonably well. However, the large number of facets makes it difficult to compute a grasp using them directly. Instead, a human user manually provides a simplified version of the object's geometry that consists only of shape primitives such as spheres, cylinders, cones and boxes. The grasp planning system has a set of rules that generates a set of grasp starting positions and pregrasp shapes that can then be tested on the object model.

Another approach to planning grasps of arbitrary objects using only fingers is described in a series of papers written by various members of DLR (the German Aerospace Research Establishment). The papers include Fischer and Hirzinger, "Fast Planning of Precision Grasps for 3D Objects", *Proceedings of the International Conference on Intelligent Robots and Systems (IROS)*, 1997, pp 120-126, Borst, et al., "A Fast and Robust Grasp Planner for Arbitrary 3D Objects", *IEEE International Conference on Robotics and Automation (ICRA)*, Detroit, Mich., May 1999, pp 1890-1896, Borst, Fischer and Hirzinger, "Calculating hand configurations for precision and pinch grasps", IEEE/RSJ/GI *International Conference on Intelligent Robots and Systems,* Lausanne, Switzerland, 2002, pp. 1553-1559, Borst, et al. "DLR Hand II—Experiments and Experiences with an Anthromorphic Hand", *IEEE International Conference on Robotics and Automation (ICRA)*, 2003, Borst, Fischer and Hirzinger, "Grasping the Dice by Dicing the Grasp", Proceedings of the International Conference on Intelligent Robots and Systems, 2003 (IROS 2003), vol. 3, pp. 3692-3697, and Hillenbrand, Brunner, Borst and Hirzinger, "The Robutler: a vision-controlled hand-arm system for manipulating bottles and glasses", *Proc.* 35*th International Symposium on Robotics*, Paris, France, March 2004. The method described in these papers may be summarized as follows: Many sets of contact points on the object are chosen randomly. Each set is tested to see if a hand in a kinematically valid, collision-free pose can attain it; those sets that fail the test are rejected. A quality measure is computed for the surviving sets, and the sets are stored in a list sorted by grasp quality. The criterion for a desirable grasp used in these papers is the ability of the grasp to resist wrenches in any direction.

There are two general lines of research that discuss planning grasps that use a palm. One line of research is represented by Trinkle, Abel, and Paul, "An Investigation of Frictionless Enveloping Grasping in the Plane", International Journal of Robotics Research, Vol. 7, No. 3, June 1988, pp 33-51. However, the algorithm described assumes that the objects are planar, so it does not apply to 3D objects. Furthermore, the algorithm deals with the case in which there is no friction between the hand and the object. A related set of papers is represented by Harada and Kaneko, "Kinematic and Internal Force in Grasping Multiple Objects," Proceedings of the 1998 Conference on Intelligent Robots and Systems, pp. 298-303. However, this analysis is applied only to a small set of objects (cylinders), and focuses only on computing contact locations and related forces. No method of planning grasps of this type is presented.

A second line of research is represented by Bard, Laugier, Melési-Bellier, Troccaz, Triggs, and Vercelli, "Achieving Dextrous Grasping by Integrating Planning and Vision Based Sensing," International Journal of Robotics Research, 14(5), pp. 445-464. In this work, the approach is to model grasping as a two-stage process of (1) selecting a hand pre-shape that does not contact the object, followed by (2) the closure of the hand to achieve contact. The grasp planning process described in the paper focuses only on the first stage. To do so, the algorithm first abstracts the shape of the object using a small set of shape primitives. Then, these abstracted shapes are used to select a hand pose and an appropriate hand pre-shape. Finally, the selected hand positions and pre-shapes are evaluated heuristically to select the most promising candidates. However, as the authors note, "[b]ecause a preshape represents an infinite set of final grasping configurations, it is not possible to apply classical stability analyses such as force close conditions . . . " They then introduce a heuristic means of evaluating grasps, which they state is "useful to reject obviously unstable solutions . . . but more reliable stability measures are needed to determine the execution parameters of a particular grasp." No such method is presented. In short, the method stops short of computing and evaluating actual grasp configurations.

In summary, research published to date is either not concerned directly with grasp planning or is concerned with planning grasps that use only the fingers. This work has only limited applicability to the problem of planning grasps that use the palm. As the paper by Hillenbrand, cited above, notes "[t]he planning for these two types of grasps is very different".

Hence, there is a need for a system and method that is able to compute desirable grasps that use the palm of a robotic hand.

SUMMARY

The present invention provides a system and method for automatically computing desirable palm grasp configurations of an object by a robotic hand. A description of the object's surface is obtained. A grasp configuration of a robotic hand comprising a palm and one or more fingers is selected, which specifies a hand configuration and joint variables of the hand and a plurality of contact points on the object's surface for the palm and fingers. The coefficient of friction at each of the contact points is determined, and a description of one or more external wrenches that may apply to the object is acquired. The ability of the robotic hand to hold the object against the external wrenches in the selected configuration is then computed.

In some embodiments, a plurality of grasp configurations may be selected by any means desirable, and compared to determine which are the most desirable. In other embodiments, the space of hand configurations, or the smaller space of palm contact configurations, may be searched to find the most desirable grasp configurations.

The desirability of a grasp configuration may be measured in various ways. In one embodiment, a quality measure is defined by solving a force optimization problem in which the largest force required to be applied by the robotic hand is minimized. In other embodiments, an approximation of the solution to the force optimization problem, or other methods, may be used.

The present invention also provides a computer-readable medium comprising program instructions for performing the steps of the method. Finally, the present invention may also be applied to precision grasps.

DETAILED DESCRIPTION

Figure 1:
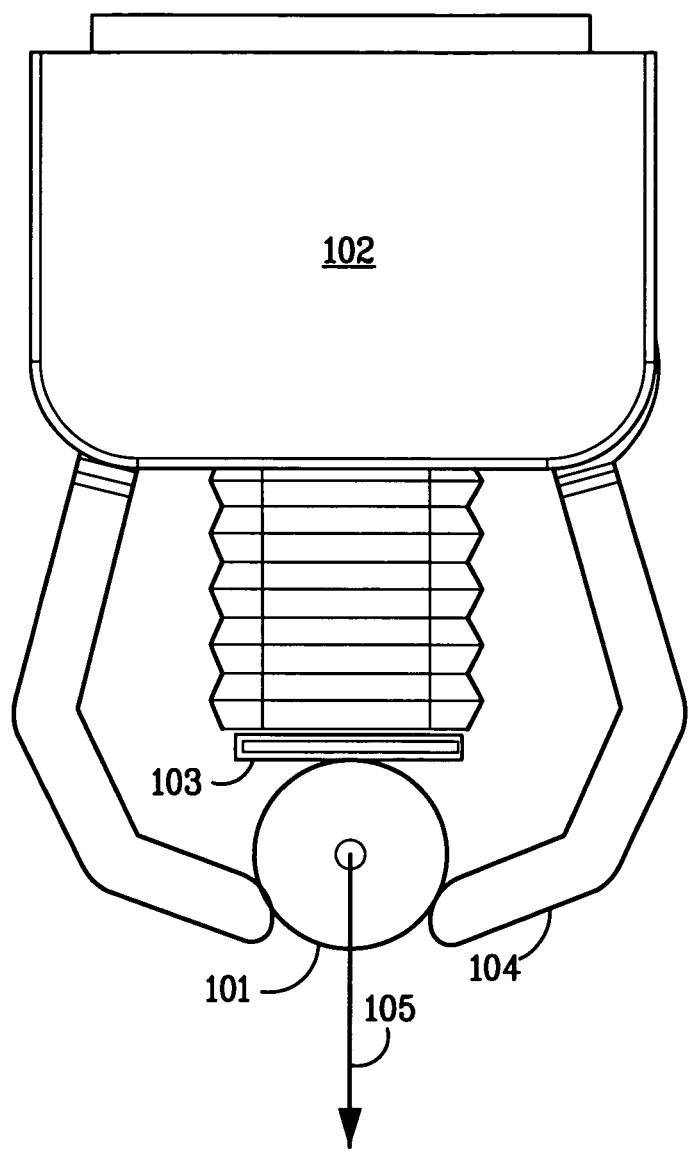
FIG. 1 is a diagram of a robotic hand of a type for which a system for computing desirable grasps may be used in accordance with an embodiment of the present invention, an object being grasped by the hand, and an external wrench which may apply to the object.

FIG. 1 shows the principal components of a robotic hand for grasping an object. A robotic hand 102 having a palm 103 and one or more fingers 104 grasps an object 101. The system for automatically computing desirable grasp configurations disclosed herein does not contain an actual robotic hand. Rather, it utilizes mathematical representations of the shown elements. The surface of object 101 is represented by one description. Robotic hand 102 can be represented by a kinematic description. A means for computing the coefficient(s) of friction at the contact points of fingers 104 is provided, as is a description of a set of external wrenches 105 to be resisted by the grasp. A computing device 106 computes one or more desirable palm grasps from the description of an object's surface, the kinematic description of the hand, the coefficients of friction, and the set of external wrenches to be resisted.

It is useful to introduce several definitions. A "pose" is the position and orientation of an object relative to a fixed coordinate system. A "hand pose" is the position and orientation of the hand base relative to a fixed coordinate system. A "hand configuration" is a hand pose together with the values of the joint variables of the hand. The "joint variables" are the finger joints and, in the case of a hand with an actuated palm, the palm joint(s). The kinematic description of a hand specifies the pose of each of the finger links and the palm as a function of the hand configuration.

A "grasp configuration" is a hand configuration in which the hand grasps an object. It specifies the pose of the hand base and the values of the joint variables such that contact surfaces of the hand are in contact with the object. A "palm grasp configuration" (or simply "palm grasp") is a grasp configuration in which the palm is one of the contact surfaces. A palm grasp configuration determines the contact points on the object's surface. The system disclosed herein computes desirable palm grasp configurations.

Figure 2:
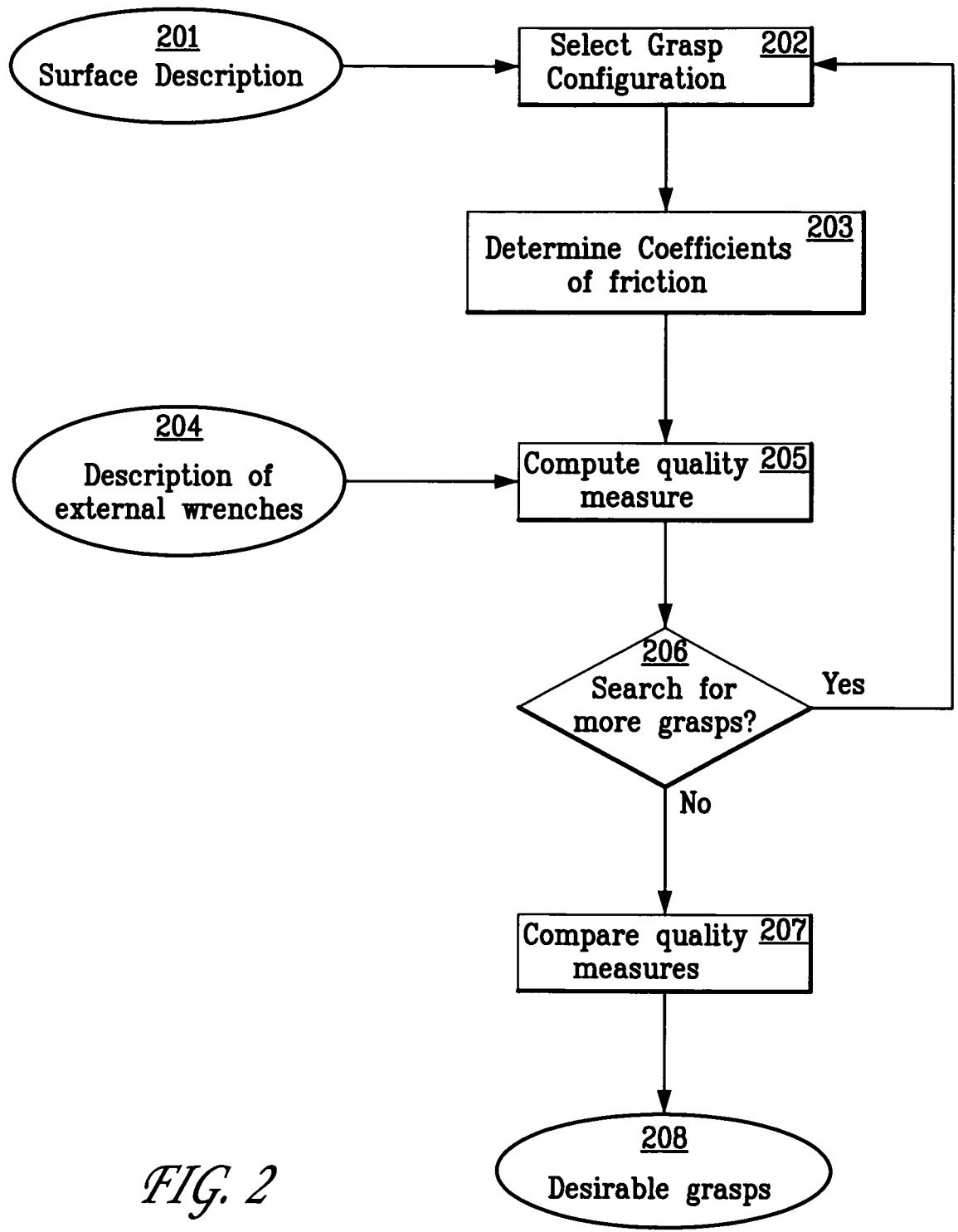
FIG. 2 is a flow diagram showing a possible method for computing desirable grasps in accordance with an embodiment of the present invention.

FIG. 2 is a flow diagram that shows the major steps of a method according to one embodiment of the invention. First, a description of an object's surface is acquired (step 201), and an initial grasp configuration is selected (step 202), which specifies a hand configuration and joint variables of the hand, and contact points on the object's surface for the palm and fingers. Next, the coefficients of friction at the contact points are determined (step 203), a description of one or more external wrenches is provided (step 204), and a quality measure, which represents the ability of the robotic hand to hold the object against the external wrenches in the selected configuration, is then computed (step 205). Next, the space of hand configurations is searched to determine if other grasp configurations should be tried (step 206), and, if so, another grasp configuration is selected (step 202) and the process repeats to evaluate the associated quality measure. Once all grasp configurations in the defined space have been evaluated, the results are compared to find the most desirable configurations (step 207) and the results provided (step 208). A desirable palm grasp is one that has desirable quality measures. The system thereby computes one or more palm grasp configurations that have desirable quality measures.

Grasping with the Palm

In a palm grasp, the palm is in contact with the object. This distinguishes a palm grasp from a precision grasp in which only the fingers are in contact with the object. In a precision grasp, the hand pose has six degrees of freedom—three for its position and three for its orientation. In contrast, a palm grasp has the property that the palm surface must be normal to the surface of the object at the contact point(s). This restricts one degree of freedom, leaving only five degrees of freedom for the hand. If the palm contact is further restricted to be at a specific location (e.g. the center of the palm), this further restricts two degrees of freedom, leaving only three degrees of freedom for the hand. However, if the palm is actuated, i.e., movable, so that the distance from the palm to the hand base can be controlled, this introduces one additional degree of freedom. Thus, there are four degrees of freedom for a hand with an actuated palm having the constraint that the object contacts it at a specific point. It is convenient to describe several embodiments for this case. This four dimensional space is referred to herein as the "palm contact configuration space" or, when there is no ambiguity, as simply the "configuration space." (A hand with a fixed palm is a simpler special case that is not treated separately here.) The situation where the points of contact are not at the center of the palm is a generalization discussed in the alternative embodiments.

Having a configuration space of a smaller dimension than that for precision grasps is a useful property of palm grasps. As described below, a system for computing desirable grasp configurations may use this property advantageously. As used herein, the four dimensions of the configuration space are as follows: one for palm extension, one for palm rotation, and two for surface position. The dimensions for the palm extension and palm rotation are straightforward. The surface position is more complex and is described below.

Several possible embodiments of a system for computing desirable grasp configurations are now described. A first embodiment deals with grasps where the contacts are all rigid and the grasp is to resist a single external wrench. A second embodiment deals with grasps where the palm is compliant. A third embodiment describes an approximation that can be used to speed up the computation. A fourth embodiment deals with grasps that must resist any of a set of external wrenches. Other embodiments are described in the section on Alternative Embodiments.

The first embodiment is described in the greatest detail, and with reference to the steps of the particular embodiment of the method shown in FIG. 2. The others are described by explaining how they differ from the first.

First Embodiment

1. Description of an Object's Surface

As above, a description of an object's surface is provided in step 201 of the method shown in FIG. 2. The object's surface may be described by a collection of surface patches, each of which is further described by a quadric function. The surface patches may be chosen so that, for any particular patch, there is a suitable patch coordinate system such that, in that coordinate system, the surface has the form $\{<u, v, H(u, v)>|<u, v> \in D\}$ where D is the domain of the patch. The domain of the patch is bounded by a pair of bounds for its u and v extent; within these bounds, the area belonging to the domain is specified by a bitmap. This representation of the object surface creates a parameterization of the object's surface so that every point on the surface can be described by a patch index and two parameters. This makes it straightforward to use the four-dimensional configuration space for palm grasps. Additionally, this representation is computationally efficient for finding the contact points of the fingers given a hand pose.

2. Kinematic Description of a Robotic Hand

A kinematic description of a robotic hand with a palm is provided. The embodiments described herein use a kinematic description of a hand that has four fingers and an extendable palm.

Figure 3:
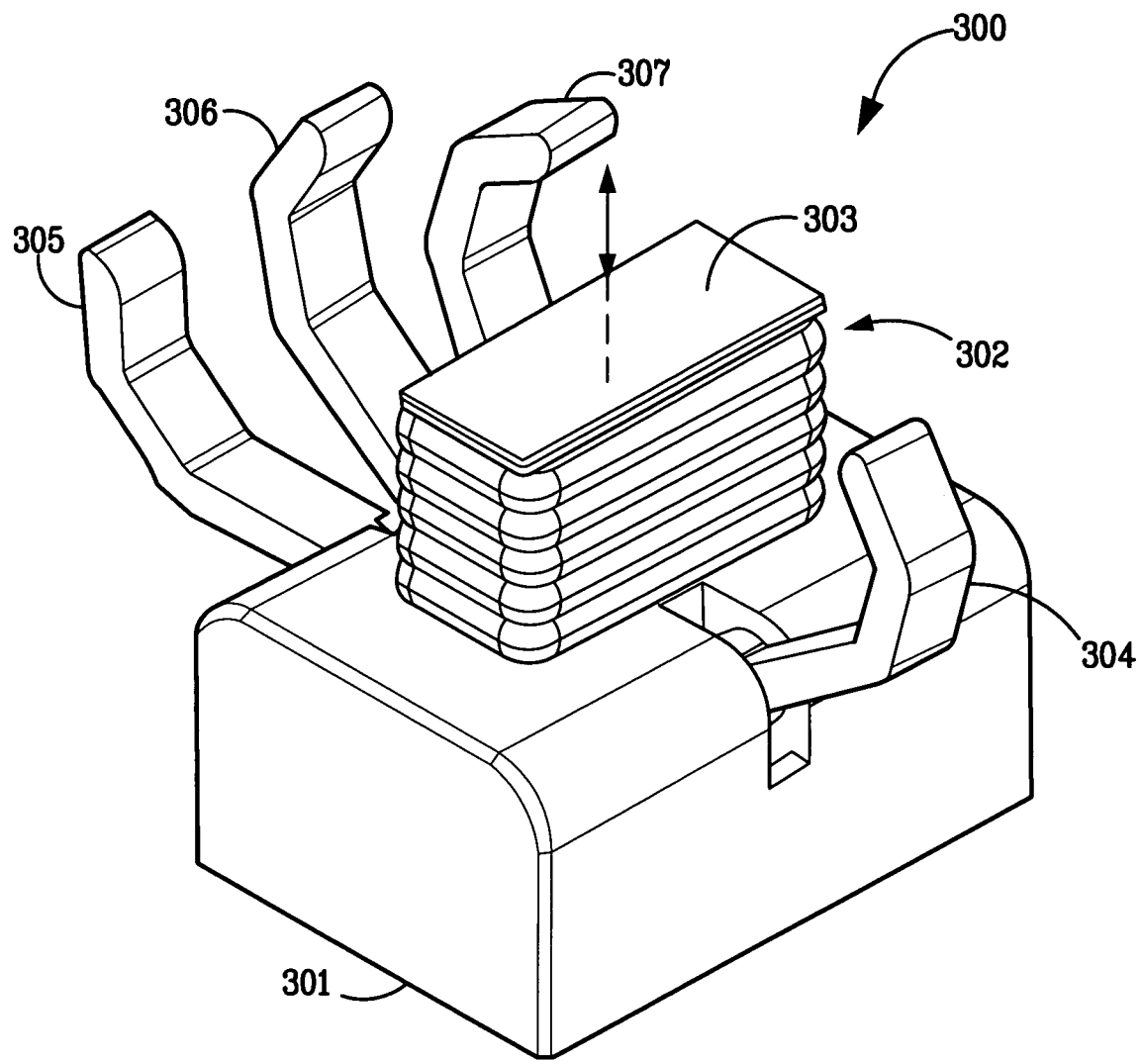
FIG. 3 shows a perspective view of a robotic hand with an extendable palm in accordance for which a system for computing desirable grasps may be used in accordance with an embodiment of the present invention.

To aid in understanding the invention, FIG. 3 shows a robotic hand 300 corresponding to the kinematic description of the embodiments described herein. Hand 300 includes a base 301, an actuated palm 302 with a palm surface 303, and fingers 304-307. The palm surface 303 is planar, and is used as the contact surface in palm grasps. The palm 302 is extendable from the base 301 and is actuated to move in a direction normal to the palm surface 303. Each finger 304-307 has a single curl joint, which serves as the attachment point between the finger and the base 301. The rotation axes of the curl joints lie generally parallel to the plane defined by contact surface 303. When actuated by their respective curl joints, finger 304 directly opposes finger 306. Such a robotic hand is described in U.S. patent application Ser. No. 11/019,808, filed Dec. 20, 2004, entitled "Robotic Hand with Extendable Palm," which is incorporated herein by reference.

Alternative embodiments may use kinematic descriptions of hands with fewer or more fingers, more joints per finger, fingers which are not directly opposed, and/or a non-planar palm surface, as discussed in the section on Alternative Embodiments.

3. Coefficients of Friction

The coefficients of friction at the contact points of the object are computed (step 203 in FIG. 2) based on the contact surface of the hand at the point of contact, i.e. the specific fingertip or the palm. Other embodiments may consider additional factors, as described in the Alternative Embodiments.

4. External Wrenches

A description of the external wrenches to be resisted by the grasp must be provided, as in step 204 of FIG. 2. As described above, several problems regarding resistance to external wrenches have been considered in various prior works. The major ones are: (1) Balancing a single specified wrench; (2) Balancing a wrench of given magnitude that may be in any direction; and (3) Balancing a wrench chosen from a set of directions, e.g. an ellipsoid in wrench space. Different grasps may be found to be optimal for resisting different external wrenches. For example, a grasp that is optimal in resisting a wrench in arbitrary directions may not, in general, be optimal in resisting a single specified wrench.

Many robotic applications, both existing and contemplated, are essentially what is known as "pick and place", i.e., an object is to be grasped, lifted from its supporting surface, moved, and placed in another location. The external wrenches experienced in this activity depend on several factors, including the dynamics of the movement and any possible change in orientation. Except in unusual cases (e.g. when the object is slid on its support) the grasp must always resist one particular external wrench, the wrench exerted by gravity acting on the object in its initial orientation. Moreover, if the orientation of the object is kept constant, the object is moved relatively slowly so dynamic effects can be neglected, and the placement of the object is done properly, then gravity is the only external wrench that needs to be considered. Accordingly, the first, second, and third embodiments described herein consider only a single external wrench, which typically is the wrench due to gravity.

The fourth embodiment and the alternative embodiments consider other external wrenches, as described below.

5. Computing Contact Points from a Hand Configuration

An initial hand configuration is assumed. In the embodiments discussed herein, it is also assumed that the palm extension is given, and that the palm is in contact with the object. From the surface description, kinematic hand description and initial hand configuration, contact points are computed.

The contact points of the palm are determined by the shape of the object where the palm makes contact and by the surface deformation at that contact. This first embodiment simplifies the situation by assuming that the object and palm are perfectly rigid. In practice, this is never exactly the case, but if the palm and the object are sufficiently stiff, this is a satisfactory model. Other embodiments model the contact deformation differently, as discussed below.

Under the assumption of perfectly rigid contact, there are four cases of palm contact: (1) If the surface is convex, the contact region is a point; (2) If the surface is cylindrical, the contact region is a line segment; (3) If the surface is planar, the contact region is the planar intersection of the palm with the planar surface; or (4) If the surface is concave, the contact region is a set of points. However, the embodiments discussed herein do not consider grasps in which the palm contacts a concave surface patch. As described below, alternative embodiments may consider this case.

This embodiment models palm contact using a set of points on the palm surface. These are referred to as "representative contact points."

(1) If the surface is convex, there is a single representative contact point.
(2) If the surface is cylindrical, the representative contact points are the ends of the line segment.
(3) If the surface is planar, the representative contact points are the vertices of the contact region.

These representative contact points provide a useful approximation. However, in the case of cylindrical and planar contacts, they overestimate the in-place torque that the palm can resist. If a conservative computation is required, the second embodiment described below may be used. As for the finger contacts, since there is a single curl joint per finger, the fingertip can contact the object in at most one place. If a finger can make contact with the object, the contact location is unique. If a finger cannot make contact, the situation can be usefully described by a "penalty," which is a monotonic function of the distance of the finger from the object at its closest approach point.

For a small object, it is possible that there will not be enough room for all four fingers to contact the object. When this occurs, a desirable grasp may often be formed using the two opposing fingers 304 and 306 together with the palm. It will be seen that two fingers and a palm provide at least three points of contact, and possibly more if the surface contacted by the palm is suitably shaped. The ability to plan desirable grasps using fewer than all the fingers is one of the useful properties of a system for computing desirable grasps as described herein.

6. Quality Measure

The desirability of a grasp may be determined by computing a "quality measure" as shown in step 205 of FIG. 2. A desirable grasp configuration has the property that the external wrenches can be balanced with small contact forces. At a given grasp configuration, there may be many possible contact forces that create a balance. In simple terms, the hand may be able to "squeeze" harder, i.e. exert more force through the contacts, and still balance the wrenches, but the additional squeezing requires more energy from the actuators and may even break the object. Hence, it is generally preferable to find the smallest contact forces required to balance an external wrench. To make this more precise, it is necessary to specify what is meant by "small contact forces".

Various criteria that may be used to judge when contact forces are "small," and different ones have been used in the prior art. The one used in the embodiments discussed herein is physically motivated. It considers the largest force that any contact point must apply in order to balance the external wrench.

As an example, assume that in some configuration of balanced forces, fingers 1 through 4 apply 9.1, 7.2, 7.3, and 7.4 Newtons respectively. Assume further that the palm is in contact with a convex surface, making point contact with it and exerting a force of 6.5 Newtons. The maximum of the contact forces is 9.1 Newtons and that is considered to be the quality measure of the grasp.

This criteria has the desirable property that it considers the total force exerted by a contact, including the shear force as well as the normal force, and considers both the force applied by the actuation motor and the reactive force applied by the structure.

A system for computing desirable grasps can use many alternative optimality criteria, some of which are discussed in the section on Alternative Embodiments.

a. Computing the Quality Measure—General

To describe how the embodiments discussed herein compute the quality measure, it is necessary to understand the mathematics of grasping and establish some mathematical notation. Some of this background material may be described in standard texts and papers on robotic manipulation.

It is convenient to index the contact points so that contact points 1 to 4 correspond to fingers 304 to 307 of FIG. 3 and the representative contact points of the palm are indexed starting with index 5.

Figure 4:
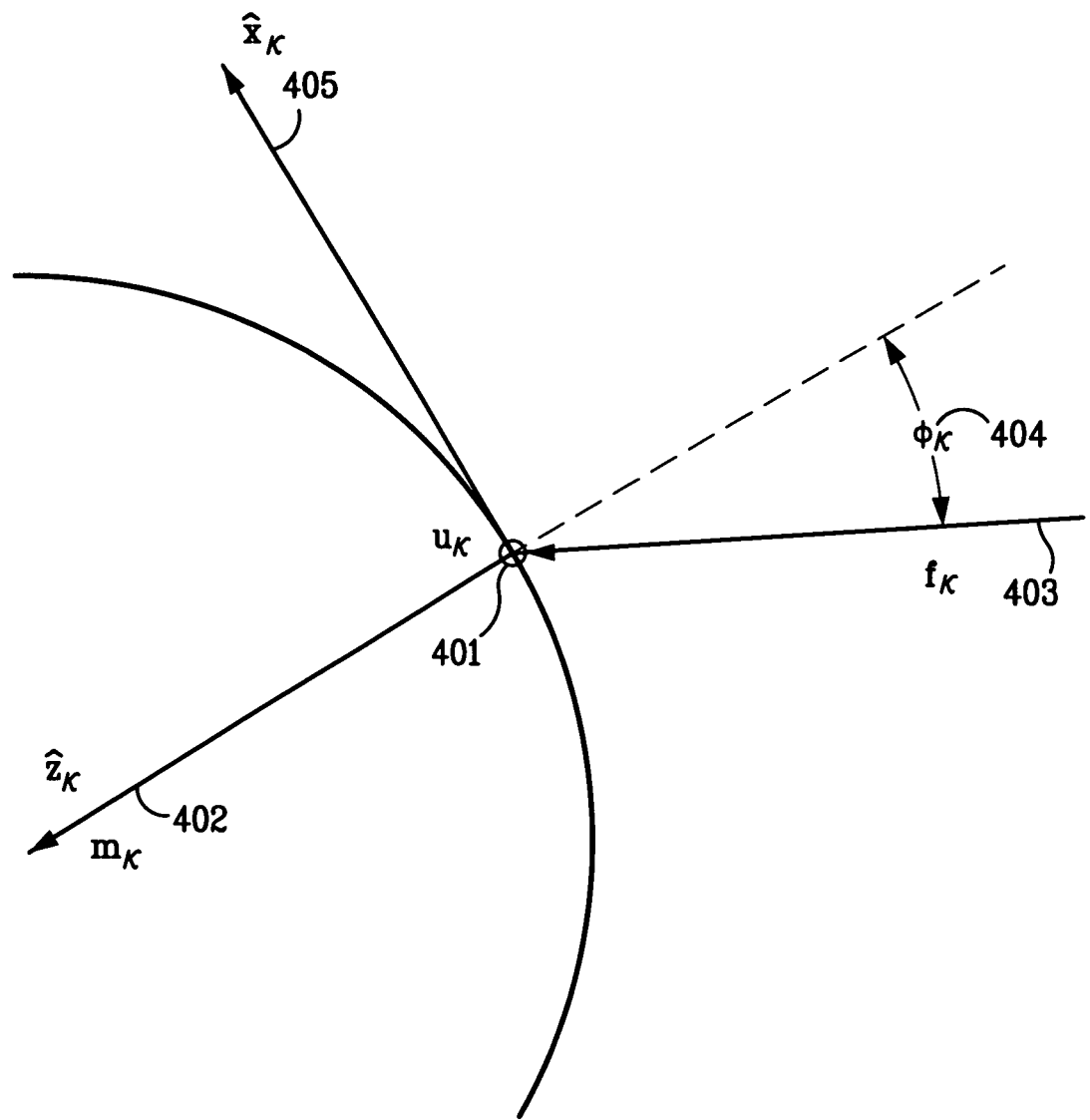
FIG. 4 shows the contact forces of a finger and a local coordinate system for describing the contact forces.
Figure 5:
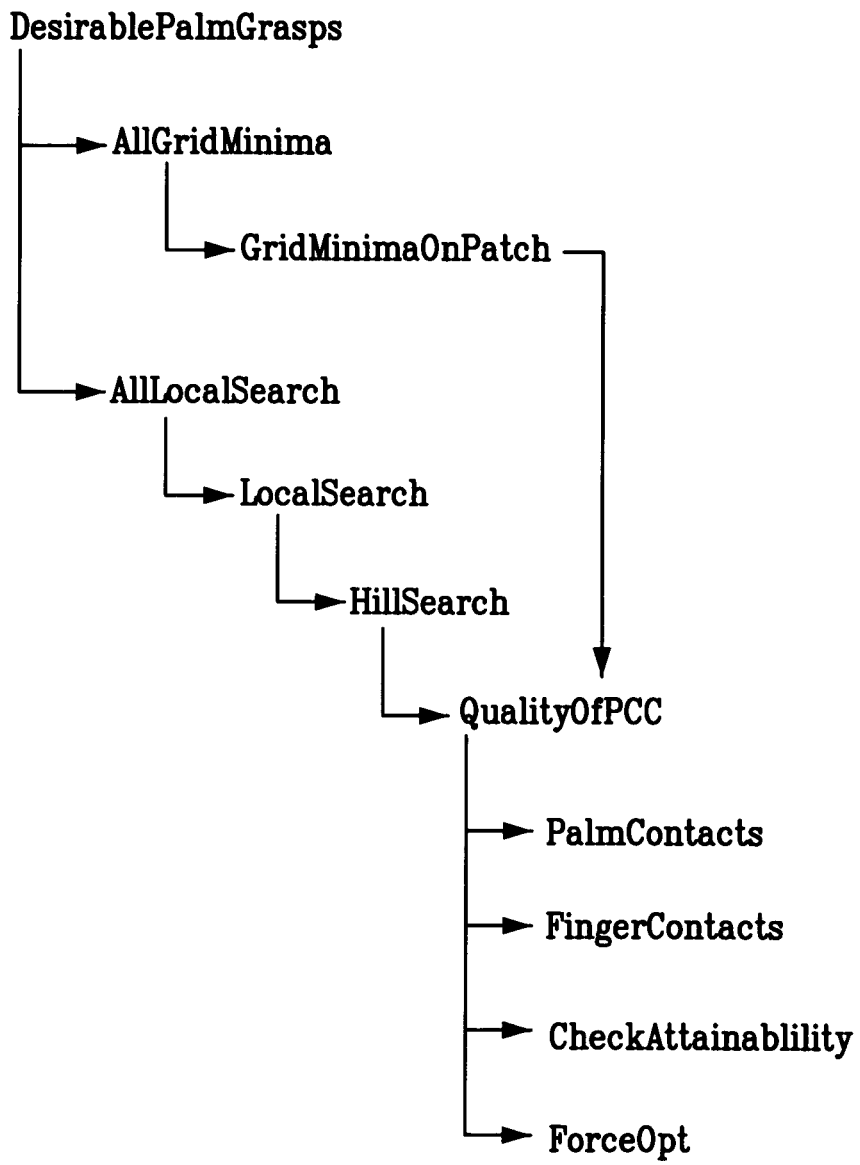
FIG. 5 shows the call structure for the computer-implemented procedures of a method for computing desirable grasps in accordance with an embodiment of the present invention.

FIG. 4 shows the contact forces of a finger. Contact point k is denoted $u_k$ 401 with unit surface normal $m_k$ 402 pointing into the object, both expressed in a global coordinate system. The contact has a line of action $f_k$ 403, which is the instantaneous motion vector of the finger at its contact point, $f_k$ being a unit vector. The angle of action 404 is $\Phi_k = a\cos(m_k^T * f_k)$ and is formed between the line of action of the contacting element and the object surface normal. As above, we use superscript $T$ to indicate transpose, so that $a^T * b$ is the inner product of the vectors a and b. At each contact point, a local coordinate system is created with the origin at $u_k$, in which the z-axis lies along the unit surface normal $m_k$, pointing inward. The x-axis 405 and y-axis are tangent to the surface at $u_k$. Each contact exerts a contact force $c_k$, where $c_k$ is described in its local coordinate system.

The contact forces for contact k considered in the embodiments discussed herein are the normal force and the two tangential frictional forces. The remaining frictional forces are the torsional friction forces at the fingertips and these are sufficiently small that they are be neglected in the exemplary embodiments. Hence, $$c_k = [\sigma_{kx}, \sigma_{ky}, n_k]$$

where $\sigma_{kx}$ and $\sigma_{ky}$ are the tangential forces and $n_k$ is the force in the normal direction.

In general, a robotic hand has N contact points: four from the fingers and one or more from the palm. Stacking the contact forces of the N contact points yields a 3N-element column vector describing all the contact forces. This is called the "contact force vector":

$$c = [c_1, c_2, \ldots, c_N]^T$$

To determine the effect of contact forces on the object, the forces must be transformed into a common object coordinate frame. It is convenient to choose the origin of the object coordinate system at the center of mass of the object, with gravity pointing in the negative z direction.

The external wrench is denoted by w. As discussed above, a common choice for w is the gravity wrench. If the weight of the object is ω, then w is the column vector $$w = [0, 0, -\omega, 0, 0, 0]^T$$

The first three components of w are the forces in the x, y, and z directions. The next three components are the torques, all of which are zero because the origin has been chosen to be the center of mass.

Let G be the linear transformation that transforms all forces from their local coordinate system to the object coordinate system, referred to herein as the "grasp matrix". The wrench balance equation expresses the general balance requirement. It states that for the object to be statically balanced, the sum of the contact forces must be equal and opposite to the external wrench, i.e., $$G * c = -w$$

G has 6 rows and 3N columns. For typical sets of contact points, it has a non-empty nullspace. That is, there are many possible values for c that satisfy the wrench balance equation. Any solution c can be written as $$c = p + h$$

The first term, p, is some solution to the particular equation, $G*p=-w$. It may be computed via any generalized right inverse. One such inverse is the Moore-Penrose inverse $G\ddagger = G^T*(G*G^T)^{-1}$. Hence, a particular solution is given by $$p = -G^T * (G*G^T)^{-1} * w$$

The Moore-Penrose inverse has the property that the resulting solution has the least norm of any solution to the wrench balance equation.

The second term, h, is the solution to the homogeneous equation, $G*h=0$. That is, h belongs to the nullspace of G. If Null(G) is a basis set for the nullspace of G, then h must be a linear combination of the columns of Null(G). Hence, for some suitably chosen vector λ, $$h = \text{Null}(G) * \lambda$$

In addition to the force balance equation, c must satisfy other constraints dictated by the nature of contact. First, the normal forces must be positive. That is, the normal components of c must satisfy $$0 \le n_k, k=1, \ldots, N$$

The conjunction of all of these inequalities on $n_k$ for the N contact points is referred to as the "positivity constraints".

In a contact situation, the tangential components of c are due to Coulomb friction. Coulomb's law of dry friction states that in static equilibrium, the frictional force is no greater than the normal force times the coefficient of static friction: Let $\mu_k$ be the coefficient of static friction for the contact between contact point k and the corresponding surface.

$$(\sigma^2_{kx} + \sigma^2_{ky})^{1/2} \le \mu_k * n_k, k=1, \ldots, N$$

The conjunction of these conditions for all N contact points is referred to as the "friction constraints". The friction and positivity constraints are referred to collectively as the "inequality constraints" on the contact force vector c.

b. Computing the Quality Measure—Contact Forces of the Palm

Next, constraints on the contact forces of the palm are considered. As above, planar contact is modeled with representative contact points. Thus, it is possible to consider modeling the forces exerted at these representative points as very stiff springs under infinitesimal deformation. Since the palm is in contact with a planar object surface, the deformation of these springs must result in points that lie in a plane. Any three of the contact points suffice to define this plane, meaning that the other points must lie in the plane defined by the first three. This is to say that the force distribution must be linear.

A linear force distribution on the representative palm contact points can be imposed as follows. For N representative palm contacts, and $k=1, \ldots, N$, let $p_k = (x_k, y_k, n_k)$, where $(x_k, y_k)$ is the location of the point in the x/y plane of the palm and $n_k$ is the force applied normal to the palm. Suppose the first three points are not collinear, and a definition $q_k = p_k - p_1$. Then the planarity constraint for point $q_k$, k>3, can be expressed as $(q_2 \times q_3)^T * q_k = 0$. This expression is linear in the components of c, and thus it can be written in the general form $0 = \rho_k * c$, where $\rho_k$ is a row vector containing expressions involving x1, x2, x3, y1, y2, y3, $x_k$ and $y_k$.

The exemplary embodiment forms an augmented grasp matrix, $G_a$ and an associated augmented external wrench vector $w_a$ as follows. Let $G_a$ be G with n−3 extra rows $\rho_4, \rho_5, \ldots \rho_n$. Let $w_a$ be w with a corresponding number of zeros appended. The resulting matrix, $G_a$, represents both the original grasp matrix and the additional linear force constraints. Then $$G_a * c = -w_a$$

expresses the wrench balance equation, subject to the linearity constraints on the representative palm contact points.

Using $G_a$ and $w_a$, gives the particular solution $$p_a = -G_a^T * (G_a * G_a^T)^{-1} * w_a$$

This particular solution satisfies the linearity constraints on the representative palm contact points. Correspondingly, Null($G_a$) is the nullspace of G restricted to those vectors that satisfy the linearity constraints on the representative palm contact points. Hence, Null($G_a$)*λ also has this property.

c. Computing the Quality Measure—Solving the Force Optimization Problem by Second-Order Cone Programming To assess the quality of a grasp it is necessary to solve the force optimization problem. The problem may be stated as follows: Given a set of contact locations and an external wrench, compute an optimal set of contact forces, within the limits of the friction cones, that balance the external wrench. The criterion of optimality used by the embodiments described herein is described above, i.e., minimizing the largest force that any contact point must apply.

With this quality measure, the force optimization problem may be stated as minimizing the largest value of $$\|c_k\|, k=1, \ldots, N$$

subject to the conditions that $$c = p_a + \text{Null}(G_a) * \lambda$$

$$0 \leq n_k, k=1, \ldots, N$$

$$(\sigma^2_{kx} + \sigma^2_{ky})^{1/2} \leq \mu_k * n_k, k=1, \ldots, N$$

Second-order cone programming provides a computationally efficient way to solve this problem. In a second-order cone program (SOCP), a linear function is minimized over the intersection of an affine set and the product of second-order (quadratic) cones. SOCPs are nonlinear convex problems that are less general than semidefinite programs. Several efficient primal-dual interior-point methods for solving SOCPs have been developed.

The described embodiment maps the force distribution problem into a SOCP as follows. Let $\gamma$ be the vector $[0, 0, 1]$, so that $\gamma^T * c_k$ is the normal component of the kth contact force $c_k$. The friction cone constraints may be expressed as a set of second-order cone constraints in the variables $c_k$, $$\|(I - \gamma * \gamma^T) * c_k\| \leq \mu_k * \gamma^T * c_k, k=1, \ldots, N$$

where I is an identity matrix of suitable size. Note that this also forces the normal components to be positive, so that this set of inequalities imposes all of the "inequality constraints" on the contact force vector c.

To minimize the largest force, introduce the slack variable s and write:

minimize s subject to $\|c_k\| \leq s, k=1, \ldots, N$ $$\|(I - \gamma * \gamma^T) * c_k\| \leq \mu_k * \gamma^T * c_k, k=1, \ldots, N$$

To express the wrench balance equation, write $$c_k = p_k \text{Null}(G_a)_k * \lambda = p_k + K_k * \lambda, k=1, \ldots, N$$

where p is the particular solution to the wrench balance equation, $p = -G_a^\ddagger * w_a$, where $K = \text{Null}(G_a)$, and where the subscript k denotes the component of each quantity for the kth contact. The expression $p_k + K_k * \lambda$ is substituted for $c_k$ in the above inequalities to give second order cone constraints.

The vector of optimization variables, x, is given by $[s, \lambda]$. The weight vector f is $[1, 0 \ldots ]$, which selects out s. This puts the force optimization problem into the form of a SOCP:

minimize $f^T * x$ subject to $\|A_i * x + b_i\| \leq c_i^T * x + d_i, i=1, \ldots, 2N$ for suitable choices of the fixed parameters are $A_i$, $b_i$, $c_i$, and $d_i$.

The first embodiment constructs this second-order cone problem and uses a standard second-order cone solver to solve it.

A vector x that satisfies the constraints is said to be a "feasible solution". It may be that the set of contact points with the specified coefficients of friction cannot resist the external wrench, so that there is no feasible solution. In this case, the second-order cone solver is unable to find a solution and reports this. The system then computes and returns a penalty, as described below.

d. Computing the Quality Measure—Penalties

As described below, the embodiments described herein search in the space of palm contact configurations. Not all palm contact configurations are grasp configurations. A palm contact configuration can fail to be a grasp configuration for several possible reasons, e.g. because the fingers are not in contact with the object or because the grasp cannot resist the specified wrench. Additionally, a grasp must meet several other criteria in order to be admissible:

(1) The angle of action $\Phi_k$ must be within the friction cone. This insures that the fingers do not slip as they apply force in forming the grasp.

(2) The grasp must be attainable. The described embodiment uses a simple model for attainability: An object is supported by the ground plane, the hand cannot interpenetrate this plane, and the fingers cannot interpenetrate this plane as they close from an open position to make contact with the object. Alternative embodiments may use a more complete model for attainability, as discussed below.

The described embodiment computes a quality measure for palm contact configurations as follows. (1) When a palm contact configuration is an admissible grasp configuration, it computes the quality measure, $f_{opt}$, of the grasp configuration. (2) If a palm contact configuration is not an admissible grasp configuration, it computes a penalty, which is a monotonic function of the constraint violation. For example, when a finger cannot contact the object, the penalty is a monotonic function of distance to the closest point on the object.

Let $f_{MAX}$ be the largest value that $f_{opt}$ can assume, due to physical limitations of the hand or limitations of the object's ability to resist crushing forces. Values larger than $f_{MAX}$ are physically inadmissible. The function GFn is defined as follows GFn(penalty, force)= if penalty >0, then $2*f_{MAX}$+penalty;

else if force<$f_{MAX}$ then force;

else $2*f_{MAX}*\text{force}/(\text{force}+f_{MAX})$

If the palm contact configuration is an admissible grasp configuration, the quality measure of the palm contact configuration is GFn(0, $f_{opt}$), which remains a continuous function regardless of the value of $f_{opt}$ and evaluates to $f_{opt}$ when $f_{opt}$ is less than $f_{MAX}$, and to no less than $f_{MAX}$ when $f_{opt}$ is greater than $f_{MAX}$. It is important that the function remain continuous so that local minima may be determined by computer application of appropriate mathematical techniques. If a palm contact configuration is not an admissible grasp configuration, the quality measure of the palm contact configuration is GFn(penalty, $f_{MAX}$), which evaluates to $2*f_{MAX}$+penalty. Thus, the function GFn is used to allow for all types of palm contact configurations without hindering the functionality of the method of computing desirable grasps.

7. Description of a Desirable Grasp

A desirable grasp is one with a small quality measure. A desirable grasp may be described by a 5-tuple, consisting of <hand pose, joint variables, active joint forces, finger contact indices, value of the objective function>. The first two components constitute a palm grasp configuration. The active joint forces are the forces exerted along the line of action at each contact point. In the case of the palm, all of these forces are summed. Hence, the active joint forces are the forces that need to be generated by the actuators. The finger contact indices specify which fingers are employed in a grasp. For a 4-finger grasp, this is simply [1, 2, 3, 4]. If, however, a 2-finger grasp between the thumb and middle finger is formed, the finger contact indices are [1, 3]. Finally, the value of the objective function is the quality measure of the grasp.

Such a 5-tuple is referred to as a "grasp force configuration." It describes a desirable grasp and how it is formed in the spatial and force domains.

8. Hand Configurations

As described above, the subset of the space of hand configurations in which the palm can contact the object is the space of palm grasp configurations. Hence, the latter space serves as a compact parameterization for the former.

9. Searching in the Space of Hand Configurations

The space of hand configurations is searched. As described above, the space of palm contact configurations is to be searched to find configurations in which the quality measure is minimized.

The quality measure function may have multiple local minima. For example, the object may have a complex shape with several spatially separated places where a desirable grasp can be secured. Depending on the object's shape, the local minima may be arbitrarily numerous and complex. The true global minimum is the smallest of these many local minima.

In order to better seek such a true global minimum, the search may be organized in two phases, (1) sampling on a grid and (2) searching for local minima.

In the first phase, the space of possible palm contact configurations is sampled discretely for each surface patch. It is convenient to choose the sample points on a regular grid. The number of points in the grid is chosen based on time available for the computation and the certainty required: More points increase the likelihood that the global minimum will be found, but also increase the computation time. For each point on the grid, the objective function is computed. Once the grid for each surface patch is computed, the local minima with respect to the grid are found. These are referred to as the "grid local minima". The grid local minima from the surface patches are combined and the combined list sorted by the value of the objective function.

In the second phase, grid local minima are each used as the starting point for a local search. The number of grid local minima so used depends on the certainty required and the time available for the computation. For each grid local minimum so used, a local function minimization routine is used to find a local minimum.

Operation of the First Embodiment

The operation of the method of the first embodiment can be described in terms of the following computer-implemented procedures which are discussed in greater detail below. The names used here are of course arbitrary, but are intended to have some relationship to the function of each procedure. These are:
DesirablePalmGrasps,
AllGridMinima,
GridMinimaOnPatch,
AllLocalSearch,
LocalSearch
HillSearch,
QualityOfPCC,
PalmContacts,
FingerContacts,
CheckAttainability,
ForceOpt.

FIG. 6 shows one possible call structure of a computer program implementing the first embodiment, where an arrow from a first procedure to a second procedure indicates that the first procedure calls the second procedure. The procedures listed above are explained below. The explanation covers only primary steps; secondary details and low-level procedures are omitted.

Global Parameters

Several of these procedures make use of global parameters, which are constants available as required to all the procedures. These include:
 the kinematic description of the hand;
 the external wrench to be balanced, w;
 a function that computes the coefficient of static friction, $\mu_k$, for each contact k;
 the number of points in the sampling grid; and
 the number of grid minima to be considered for local search.

DesirablePalmGrasps is the main procedure. The input to DesirablePalmGrasps is a description of an object. This procedure first calls AllGridMinima to find the grid minima on all the surface patches of the object. It then sorts the grid minima by the value of the objective function. Next, it calls AllLocalSearch, supplying the sorted set of grid minima as an input and receiving a list of grasp force configurations at local minima as the result. Finally, it sorts the list of grasp force configurations by quality of the grasp and returns a sorted list of grasp force configurations as its result.

AllGridMinima: The input to AllGridMinima is a description of an object. The procedure considers each non-concave surface patch of the object and calls the procedure GridMinimaOnPatch to compute a list of grid minima for each such patch. AllGridMinima collects the grid minima from the several calls into a list and returns the list.

GridMinimaOnPatch: GridMinimaOnPatch proceeds as follows.
(1) It determines the bounds of the 4-dimensional palm contact configuration space. These are the bounds on the u and v values of the surface patch, the bounds on the palm rotation θ, and the bounds on the palm extension t. The <u, v> bounds are obtained from the surface patch description; the palm extension bounds are obtained from the kinematic description of the hand; the bounds on rotation are taken to be between $-\pi$ and $\pi$.
(2) It samples the palm contact configuration space on a regular grid, calling the procedure QualityOfPCC to compute the value of $f_{opt}$ at each point q=<u, v, θ, t> in the grid.
(3) It finds the set of grid local minima, Q. That is, $Q=\{q | f_{opt}(q) < f_{opt}(q_2)$ for all $q_2$ such that $q_2 \neq q$, $q_2 \in$ grid, and $q_2$ is adjacent to q in the grid.
(4) It returns a list of the grid minima and the associated surface patch for each minimum.

AllLocalSearch: The input to AllLocalSearch is a description of an object and an ordered list of grid minima together with the associated surface patch. It proceeds as follows:
(1) It chooses the number of grid minima to be considered, based on their relative values and the limit on the number to be considered. The limit is a global parameter chosen based on the amount of time available for the computation.
(2) For each of the grid minima to be considered, it calls LocalSearch to find the local minimum corresponding to each grid minimum and the grasp force configuration at that local minimum.
(3) It returns the list of grasp force configurations.

LocalSearch: The input to LocalSearch is a description of an object, a grid minimum, and the associated surface patch. Using the grid minimum as an initial value, it performs a local optimization, which is carried out by the functional procedure HillSearch, which in turn uses the function QualityOfPCC. The output of LocalSearch is the value of $f_{opt}$ and the corresponding grasp force configuration.

HillSearch: The functional procedure HillSearch takes as its input a function $F(q, a_1, \ldots a_n)$, an initial value $q_0$, and a set of bounds for the vector q. It searches for the value of q within the specified bounds that minimizes F with the other arguments fixed. The search is carried out by checking the value of $F(q^*, a_1, \ldots a_n)$ at nearby locations $q^*$, where $q^*$ differs from q by plus or minus $dq_k$ in each dimension. If a smaller value is found, $q^*$ is taken as the new value. If no smaller value is found, then dq is decreased. The process continues until the dq is decreased to a specified tolerance.

QualityOfPCC: The procedure QualityOfPCC takes as its input a palm contact configuration q=<u, v, θ, t>, an object, and a surface patch on that object. The procedure executes the following steps.
(1) It calls PalmContacts to compute the corresponding hand pose and the set of palm contacts (or compute a penalty).
(2) It calls FingerContacts to compute the finger contact points at that palm contact configuration (or compute a penalty).
(3) It calls CheckAttainability to verify that the hand pose and contacts are kinematically attainable (or compute a penalty).
(4) It computes the grasp matrix, G.
(5) It augments the grasp matrix with additional rows for the linearity constraints.
(6) It calls ForceOpt to solve the force optimization problem. If the grasp is admissible, the output of QualityOfPCC is the value of GFn(0, $f_{opt}$) and the grasp configuration. If the grasp is not admissible, the output of QualityOfPCC is GFn (penalty, $f_{MAX}$) and a null configuration.

PalmContacts: The procedure PalmContacts takes as input a surface patch and a palm contact configuration <u, v, θ, t>. It computes the hand pose when the center of the palm is in contact with the patch at <u, v>, when the initial rotation of the hand is θ, and the palm extension is t. The procedure also computes the representative contact points of the palm with the patch, as described above. There are two cases:
(1) In the normal, successful case, PalmContacts returns the hand frame at contact and the representative palm contact points.
(2) If there is no contact, e.g. because the point <u, v> lies outside the boundary of the patch, PalmContacts returns a penalty that is a monotonic function of the distance from the nearest point that does lie on the patch.

FingerContacts: The procedure FingerContacts takes as input a surface patch and a hand pose. The procedure computes the contact point of each finger with the patch. There are three cases:
(1) In the normal case, FingerContacts returns the finger contact points, the surface normals, the lines of action, the joint angles, and the finger contact indices.
(2) If there is no contact for some finger, FingerContacts returns a penalty, which is a monotonic function of the distance from the nearest contact point for that finger that is farthest from making contact.
(3) FingerContacts also checks that, at the contact points, the line of force applied by each finger is within the friction cone. If any of the finger contacts lie outside the friction cone, FingerContacts returns a penalty, which is a monotonic function of the distance from the friction cone for the finger that is farthest outside the friction cone.

CheckAttainability: The procedure CheckAttainability takes as its input a hand pose. The procedure verifies that the hand at that pose is free from collision with the support surface and that the fingers can be closed into the contact configuration without colliding with the support surface. If there is a collision with the support surface, CheckAttainability returns a penalty that is a monotonic function of the largest interpenetration distance.

ForceOpt: The procedure ForceOpt takes as input the augmented grasp matrix $G_a$, a set of surface normals, and an external wrench $w_a$. The procedure solves the force optimization problem in the following steps.
(1) It computes the particular solution as $p=-G_a^{T}*(G_a*G_a^T)^{-1}*w_a$.
(2) It computes the nullspace of $G_a$, Null($G_a$).
(3) It sets up a second-order cone problem, SOCP, as described above.
(4) It calls a standard solver to solve the SOCP.
(5) It extracts from the solution the value of the objective function and the vector of contact forces.

Second Embodiment

The first embodiment models the contact between the palm and the object by assuming that both are perfectly rigid. The second embodiment treats the case where the materials are not perfectly rigid and there is a limited amount of deformation. Specifically, the second embodiment models small linear deformations of the palm and assumes that the object is perfectly rigid. Alternative embodiments may model more complex cases, as described in the section on alternative embodiments.

The desirability of modeling limited deformation may be seen from the following example. Suppose the palm is in contact with a slightly curved surface, e.g. one where the radius of curvature is 500 mm. Assuming perfect rigidity, there is a single point contact. However, if the palm actually deforms by 2 mm, then the contact is distributed along an arc that is approximately 90 mm long, the actual extent depending on the palm size. This contact arc provides a wide base of support that may significantly assist in stabilizing the grasp.

To this end, it is advantageous for the hand to be designed with a palm surface composed of an elastic material that will passively comply with the object grasped as illustrated above. Typically, this will take the form of an elastic pad covering the palm. The method described herein can model the elastic deformation of the palm and thereby model the base of support produced by that deformation. This contributes to the accuracy of the planned grasps. A contact between an object and an deformable palm is referred to as a "soft contact."

When the object is highly curved, the contact is similar to the point contact of the first embodiment. However, it differs because such a "soft point contact" can resist a torque exerted about an axis normal to the surface of the palm. The latter is referred to as a "tangential" torque.

When one or more of the radii of curvature are large, the second embodiment uses a suitable approximation. If the radius of curvature is large in both directions, the situation is modeled as a plane. If the radius of curvature is large in only one direction, the case is modeled as a cylinder.

In the second embodiment, the representative contact points are chosen to ensure that they conservatively approximate the tangential torque that can be resisted by the soft contact. More specifically, if an object is pressed into the palm with an applied force F, the contact will be able to resist some maximum tangential torque $G^*$. If a set of n representative contact points $q_1, q_2, \ldots q_n$, s chosen and it is assumed that an equal distribution of forces, the tangential torque that these points can resist is $$G=\mu^* F^* \Sigma_{i=1\ldots n} \|q_i\|/n$$

To be conservative, it is required that $G \leq G^*$.

This conservative approximation is generated in three steps: 1) by computing a conservative approximation of the size and depth of the palm surface deformation generated by an object for a given applied force; 2) from this, computing a conservative approximation to the tangential torque that this contact can resist; and 3) computing representative contact points that can resist no more than this amount of tangential torque.

Computing the Depth of Depression

As before, let u denote a point of contact on the surface of an object, and let m denote the unit normal vector to the surface at that point. Let $t_x$ and $t_y$ denote the principal curvatures of the surface at the point of contact, and let $e_x$ and $e_y$ denote the corresponding directions. The point u together with the mutually orthogonal vectors $e_x$ and $e_y$ and m define a local coordinate system on the surface. In this coordinate system, the principal (or osculating) quadric, defined as, $$z(x,y)=(t_x^* x^2 + t_y^* y^2)/2$$

locally approximates the surface to second order.

Let d denote the depth of penetration of the object into the palm surface at u. The depth of depression at a location (x, y) on the palm surface is then $$z(x,y,d)=\min(0,(t_x^* x^2 + t_y^* y^2)/2 - d)$$

Let E be the modulus of elasticity (Young's modulus) of the material covering the surface of the palm, and let T denote the thickness of the material. Neglecting tangential stress, the force exerted on the object is given by $$F=-(E/T)^* \int_A (t_x^* x^2 + t_y^* y^2)/2 - d \, dA$$

where A denotes the area of contact between the object and the palm.

Given a value of F, the value of d can be computed by solving this integral and then solving the resulting expression for d. For the three cases of interest, the solutions are as follows:

Planar Contact ($t_x=t_y=0$): The solution is $$d=d_p=(F/A_p)^*(T/E)$$

where $A_p$ is the surface area of the palm that is in contact with the object.

Cylindrical Contact ($t_x=0$ or $t_y=0$): Suppose $t_x=0$ and the length of the cylindrical contact in the x direction is $2^* r_x$. In this case, the depth of penetration is $$d_{cx}=((3^* F^* T)/(8^* r_x^* E)^*(t_y/2)^{1/2})^{2/3}$$

The case when $t_y=0$ is completely symmetrical and produces a value $d_{cy}$.

Given a value of $d_{cx}$ computed as above, the radius of contact with the palm surface in the y direction is $r_y=(2^* d_{cx}/t_y)^{1/2}$. If $r_y$ is larger than the radius of contact between the object and the palm in the direction $e_y$, then the area of contact assumed by the cylindrical model is larger than that actually encountered and, as a result, the value of $d_{cx}$ will be smaller than the true value. If the discrepancy is very large, the planar contact model value, $d_p$, provides a better, yet conservative, approximation. To take advantage of this fact, the value of d is computed as $$d=\max(d_p, d_{cx})$$

Again, the case when $t_y=0$ is completely symmetrical.

Point Contact: In the general case, the depth of depression at the point of contact is $$d_g=(F^* T/(\pi^* E))^{1/2} *(t_x^* t_y)^{1/4}$$

The area of contact in the plane of the palm forms an ellipse with principal radii $r_x=(2^* d/t_x)^{1/2}$ and $r_y=(2^* d/t_y)^{1/2}$. This ellipse will henceforth be referred to as the "contact ellipse."

As with the cylindrical case, it is possible that the contact ellipse extends beyond the area of contact between the palm and the object, in which case the value of $d_g$ will again be smaller than the actual value. Depending on the contact situation, a cylindrical or planar contact model may provide a better approximation. Thus, if the contact extends beyond the edge of the palm, the value of d is computed as $$d=\max(d_p, d_{cx}, d_c, d_g)$$

As a final step, the value of d computed above is checked to ensure that it remains within the linear region of the material (taken in the exemplary embodiment to be T/2). If it extends beyond this level of deformation, the value of d is adjusted to be $$d_{new}=T^*(1-\tfrac{1}{2}^* \exp(-d(d-T/2)/(\lambda^* T)))$$

where, in the exemplary embodiment, $\lambda=1$. Both $\lambda$ and T/2 are design parameters that are chosen based on the material in question.

Computing the Maximum Tangential Torque

Given a depth of penetration d, the maximum tangential torque that can be resisted by friction at a soft contact is $$G=-(\mu^* E/T)^* \int_A (x^2+y^2)^{1/2} *((t_x^* x^2 + t_y^* y^2)/2 - d) dA$$

where A is the area of contact between the object and the palm surface.

From this equation, it follows that G increases with increasing d and with increasing A. In the previous step, d was computed conservatively. In this situation, A must be taken conservatively. As before, there are 3 cases.

Planar Case: In the case of a planar contact, the result is $$G=(d^* \mu^* E/T)^* \int_{A_p} (x^2+y^2)^{1/2} dA$$

where $A_p$ is the area of contact between the object and the palm surface. This integral does not exist in closed form; however, for a given size palm it may be computed once numerically and stored as a constant value. If the contact area is smaller than the entire palm surface, the method may instead compute the largest rectangle, R, that is contained within $A_p$. The above integrals are then evaluated numerically over R. In practice, the values of these integrals for several rectangles are pre-computed and stored in a table. The online computation then reduces to a table lookup.

Cylindrical Case: Again consider the case $t_x=0$. The result is $$\begin{aligned}G &= (\mu * E/T) * \int_{A_c} (x^2+y^2)^{1/2} * (t_y * y^2/2 - d) dA \\ &= (\mu * E/T) * \left( d * \int_{A_c} (x^2+y^2)^{1/2} dA - (t_y/2) * \int_{A_c} y^2 * (x^2+y^2)^{1/2} dA \right)\end{aligned}$$

where $A_c$ is the area of contact between the cylinder and the palm surface. This area may be irregular, making the integral difficult to compute accurately. To simplify the computation, the method may instead compute the largest rectangle, R, that is contained within $A_c$. The above integrals are then evaluated numerically over R. In practice, the values of these integrals for several rectangles are pre-computed and stored in a table, reducing online computation to a table lookup.

Point Contact: For a soft point contact, the general solution is $$G=(4*\mu*E*d^2/(15*T))*(2*d*t_x/(t_x*t_y))^{1/2}*E_2(2*\pi, ((t_x-t_y)/t_x)^{1/2})$$

where $E_2$ denotes the elliptic integral of the second kind.

As noted previously, it may be the case that the contact ellipse extends beyond the area of contact between the palm and the object in one or more directions. In these cases, a conservative approximation to the torque is computed as follows. Recall that the contact ellipse had principal radii $r_x$ and $r_y$. The exemplary embodiment now computes a scaling factor, $0<s<1$ so that an ellipse with radii $s*r_x$ and $s*r_y$ fits within the contact area. This is referred to as the "nominal contact ellipse." Note that the nominal contact ellipse has a corresponding depth of depression $$d_x = \tfrac{1}{2} * t_x * s^2 * r_x^2.$$

Let $d_d = d - d_n$ or, equivalently $d = d_n + d_d$. Tangential torque can be computed by solving $$G = -(\mu*E/T)*\int_{A_n}(x^2+y^2)^{1/2}*((t_x*x^2+t_y*y^2)/2-(d_d+d_n)) dA$$

where $A_n$ is now the area of the nominal contact ellipse. The solution is $$G=(\mu*E*d_d/(15*T))*(2*d_n*t_x/(t_x*t_y))^{1/2}*(4*d_n+10*d_d)*E_2(2*\pi,((t_x-t_y)/t_x)^{1/2})$$

Computing Representative Contact Points

Finally, in the second embodiment a collection of representative contact points is chosen that will conservatively approximate the torque that can be exerted by the palm. As above, there are three cases.

Planar Contact: There are 4 representative points chosen along the lines extending from the center of the palm to the corners. These points have coordinates $\lambda*(\pm w/2, \pm l/2)$, where w and l are the width and length of the palm, respectively, and $0 \le \lambda \le 1$. The value of $\lambda$ is computed by solving $$G=\mu*F*\lambda*(w^2+l^2)^{1/2} \text{ giving } \lambda=G/(\mu*F*\lambda*(w^2+l^2)^{1/2}.$$

If $\lambda > 1$, the representative contact points are placed at the extreme corners of the palm. Note that doing so is a conservative approximation, as the tangential torque that can be resisted by these representative points is a lower bound on the true value. If the area of contact is smaller than the palm, the value of $\lambda$ is further reduced until the points lie within the area of contact.

Cylindrical Contact: Let $e_x$ be the direction of the axis of the cylinder, and $e_y$ be the orthogonal direction parallel to the palm surface. For a cylindrical contact, the first two representative points are placed at the extreme edges of the region of contact between the palm and the object along $e_x$. Let $d_{x1}$ and $d_{x2}$ denote the distance of these representative points from the center of the palm.

The method of the second embodiment first checks to determine if $$G \le \mu*F*(d_{x1}+d_{x2})$$

If this is not the case, both $d_{x1}$ and $d_{x2}$ are reduced by a scaling factor $0 \le \lambda < 1$ until the inequality holds.

The remaining representative contact are points located a distance $\pm d_y$ along $e_y$ by solving $$G=\mu*F*(d_{x1}+d_{x2}+2*d_y)$$

for $d_y$, giving $$d_y=(G/(\mu*F)-(d_{x1}+d_{x2}))/2$$

If the resulting value of $d_y$ would cause the representative points to be placed beyond the region of contact between the palm and the object, the value of $d_y$ is reduced until the representative points lie within the region of contact. This again produces a conservative approximation to the tangential torque that can be resisted by the contact.

Point Contact: As before, let $e_x$ and $e_y$ be the directions of the principal curvatures. For a point-like contact, four representative points are chosen: two located a distance $\pm d_x$ along $e_x$ and two located a distance $\pm d_y$ along $e_y$.

For a given force F, the tangential torque that can be resisted by these points is $$G=\mu*F*(d_x+d_y)/2$$

It is also required that $t_x*d_x^2=t_y*d_y^2$ which ensures the points have the same depth of depression. From these two equations, it is computed $$d_x=2*G/(\mu*F*(1+(t_x/t_y)^{1/2}))$$

and $$d_y=2*G/(\mu*F*(1+(t_y/t_x)^{1/2}))$$

If the value of either $d_x$ or $d_y$ would place the resulting representative contact points beyond the region of contact between the object and the palm, a fraction $0 \le \lambda \le 1$ is computed so that $\pm \lambda*d_x*e_x$ and $\pm \lambda*d_y*e_y$ are within the region of contact. This again produces a conservative approximation to the tangential torque that can be resisted by the contact.

In addition to tangential torque, a soft contact may also be able to resist torque exerted about an axis lying in the plane of the palm. This is referred to as an "out of plane" torque.

Out of plane torque is generated when small motions of the object depress the elastic surface more on one side of the palm than the other. As with tangential torque, the goal is to ensure a conservative approximation of such effects. This will make use of the mechanism as described in the first embodiment, whereby constraints are placed on the force values of the representative points.

The first embodiment made use of planarity constraints on the contact forces of representative points. The second embodiment additionally makes use of equality constraints. These constraints are enforced by appending additional rows to the augmented grasp matrix. For example, suppose there are four palm contact points and let the contact forces of the four fingers be $c_F$. Then the contact force vector has the form, $c=[c_F, \sigma_{x5}, \sigma_{y5}, n_5, \sigma_{x6}, \sigma_{y6}, n_6, \sigma_{x7}, \sigma_{y7}, n_7, \sigma_{x8}, \sigma_{y8}, n_8]$. Let $\rho_F$ be a vector of 12 zeros, corresponding to the finger contacts. If a vector $\rho=[\rho_F, 0,0,1, 0,0,-1, 0,0,0, 0,0,0]$ is constructed, then the equation $\rho^T*c=0$ enforces the constraint that $n_5=n_6$. By changing the location of the $1/-1$ pair in $\rho$ it is possible enforce equality between any of the palm components of c. When several equalities are desired, a row vector is constructed for each.

For a soft point contact, the forces on all representative contact points must be equal, which is equivalent to stating that a soft point contact cannot resist any out-of-plane torque. For a soft cylindrical contact, the forces applied by the representative contact points in the direction orthogonal to the cylinder axis must be equal. This ensures that the contact points can only resist out-of-plane torques about the axis orthogonal to the axis of the cylinder. The forces are also required to satisfy the planarity constraint.

Finally, only planarity constraints are imposed on the representative contact points of a soft planar contact. This allows them to resist out-of-plane torques about any axis lying in the plane of the palm.

In summary, the computations above are designed so that the value of both out-of-plane and tangential torques that can be resisted by the contact is a conservative approximation at every step. Hence, grasps will be computed conservatively.

Computing the Force Applied by the Palm

When the palm contacts a surface, the representative contact points are computed as described above. However, to perform this computation it is necessary to know the force applied by the palm. This in turn is given by the solution to the force optimization problem which, however, makes use of representative contact points. Thus, there is a mutual inter-dependence. The second embodiment solves the mutual interdependence dependence iteratively.

The method proceeds as follows. Assume that the normal force applied by the palm is $n_a$. Under this assumption, the deformation of the palm and the representative contact points are computed as described above. Given the set of contact points, the force optimization problem is solved as described in the first embodiment. Let $n_c$ be the palm normal force computed in the resulting solution. Express this relationship in functional form as $n_c=M(n_a)$. A consistent normal palm force satisfies the fixed-point equation $n_s=M(n_s)$ to within a required tolerance, tol.

The second embodiment computes $n_s$ as follows.
(1) Let $n_0=M(0)$. If $abs(n_0)<tol$, then $n_s=0$ is chosen as a consistent palm force.
(2) Otherwise, if $abs(M(n_0)-n_0)<tol$, then $n_s=n_0$ is chosen as a consistent palm force.
(3) Otherwise, it is typically the case that $n_0>M(0)$, in which case the fixed point is bracketed by tol and $n_0$. If not, the bracket is found as follows:
initialize $n=n_0$,
iterate $n=M(n)$, until $n>M(n)$
Let $n_H$ be the first value of $n_{k+1}$ such that $n_{k+1}>M(n_k)$
(4) It is convenient to define $R(n)=M(n)-n$, so that $n_s$ is a root of R. That root is bracketed between tol and $n_H$. The second exemplary embodiment uses Riders' method for root finding to find $n_s$. Alternative embodiments could use alternative means to find the root. These and other methods of root finding are described in standard texts on numerical analysis.

Operation of the Second Embodiment

The operation of the second embodiment is similar to that of the first embodiment. To avoid unnecessary repetition, only the major differences are described. The suffix E is used in order to distinguish the procedures of this embodiment from those of the first embodiment.

Global Parameters

The second embodiment uses as additional global parameters:
the thickness of the palm pad; and
the modulus of elasticity of the palm pad (Young's modulus).
QualityOfPCCE: In this embodiment, the procedure QualityOfPCCE differs from its counterpart in the first embodiment in the following respects:
(1) Let tol be a small force to be used as the tolerance in the fixed-point computation. QualityOfPCCE calls PalmContactsE with a small nominal palm normal force, palmNFA=tol.
(2) It augments the grasp matrix with additional rows for planarity constraints and for equality constraints as needed when there is more than one representative contact point in the interior of the palm.
(3) After calling ForceOpt, it proceeds as follows. Let c be the contact force vector computed by ForceOpt and let palmNFC be the normal component of the palm force extracted from c. If $abs(palmNFA-palmNFC)<tol$, then the fixed point relationship for the palm normal force is satisfied to within the specified tolerance and QualityOfPCCE returns. Otherwise, it calls FixedPointPalmNormalForce.

FixedPointPalmNormalForce: The procedure FixedPointPalmNormalForce finds a palm normal force that satisfies the fixed-point relationship, as described above.

PalmContactsE: The procedure PalmContactsE differs from its counterpart in the first embodiment in that it takes an additional argument, an assumed normal force exerted by the palm. It obtains the thickness of the pad covering the palm and the modulus of elasticity of the pad from the global parameters. It computes the representative contact points of the palm with the surface patch based on the deformation of the pad under the assumed force, as described above.

Third Embodiment

Computing the quality measure entails solving the force optimization problem, which is computationally expensive. As described above, it must be computed for many grasp configurations in order to find a desirable grasp—first in sampling on the grid and then in local optimization. Collectively, this is time-consuming. In many situations, it is useful to be able to compute a desirable grasp quickly and it is acceptable that reasonable approximations be made. In these situations, an approximation that can be quickly computed is appropriate.

The third embodiment is designed for these situations. In general terms, it employs the following idea. Let f(x) be a function of which a minimum value is sought. Suppose there is another function g(x) whose minimum value occurs at a value that is close to the value at which f(x) is minimal. That is, $$arg\ min(x)g(x) \approx arg\ min(x)f(x)$$

Under these conditions, one can compute an approximation to the minimum value of f(x) by finding $x_g$ that minimizes g(x) and evaluating f(x) at $x_g$. That is, the computation is $$\text{Compute } x_g=argmin(x)g(x)$$

$$\text{Choose } y_g=f(x_g)$$

Under the stated assumptions, the resulting $y_g$ is close to the minimal value of f. Note that there is no requirement that $g(x_g) \approx f(x_g)$. It is simply required that the minima of the two functions occur at nearby locations. When there are multiple local minima rather than a global minimum, the same line of reasoning applies; it suffices that the approximating function has a shape similar to the true function in the neighborhood of the local minima. Such a function is referred to as a "shape approximating function." Functions used for related purposes are sometimes referred to in the optimization literature as "surrogate functions."

A Shape Approximating Function for the Force Optimization Problem

Recall that the exact solution to the force optimization problem may be formulated as minimize the largest value of $\|c_k\|$, $k=1, \ldots, N$ subject to $c=p_a+\text{Null}(G_a)*\lambda$ $0 \leq n_k$, $k=1, \ldots, N$ $(\sigma_{kx}^2+\sigma_{ky}^2)^{1/2} \leq \mu_k * n_k$, $k=1, \ldots, N$ Let $c\dagger = p_a + h\dagger$ be the optimal solution, where $h\dagger = \text{Null}(G_a) * \lambda$. The third embodiment computes a shape approximating function by computing an approximation to $h\dagger$ based on the geometry of the hand and surface normals at the contact points. Recall that the contact points are indexed so that contact points 1 to 4 correspond to fingers 304 to 307 of FIG. 3 and the representative contact points for the palm are indexed starting with index 5. Recall that the forces at each contact point are described by a vector $c_k$ represented in a local coordinate system defined so that the third component is the force along the surface normal. Finger 304 opposes the other three fingers, so that a rough approximation to the forces of the fingers is given by $cF_1 = [0,0,1]^T$ $cF_k = [0,0,1/3]^T$ for $k=2 \ldots 4$ The corresponding rough approximation to the palm forces, $cPalm_k$, is obtained as follows. Let $m_5$ be the outward-pointing unit normal of the palm. Let $fParallel_k$ be the projection of $cF_k$ along the inward-pointing palm normal $fParallel_k = -cF_k^T * m_5$, $k=1, \ldots, 4$ Let $\alpha_k$ be the angle between the kth finger normal and the inward palm normal, i.e. $\alpha_k = a \cos(-m_k^T * m_5)$. Let $n_k$ be the third component of $cF_k$. Define $fTangential_k$ as $fTangential_k = \mu_k * n_k * \sin(\alpha_k)$, $k=1, \ldots, 4$ Define fPalm as $fPalm = \max(0, \Sigma_{k=1, \ldots, 4}(fParallel_k + fTangential_k))$ Let nPalmContacts be the number of representative points on the palm. For each of the palm contacts define $cPalm_k = [0,0,fPalm/nPalmContacts]$, $k=5, \ldots, N$ cV is obtained by stacking the four $cF_k$ vectors with the several $cPalm_k$ vectors, producing a column vector of the same length as c. The vector cV projected onto the null space of the augmented grasp matrix, giving a vector $d_h$ $d_h = (I - G_a\ddagger * G_a) * cV$ where $G_a\ddagger$ is the Moore-Penrose inverse, $G_a\ddagger = G_a^T * (G_a * G_a^T)^{-1}$. The factor $(I - G_a\ddagger * G_a)$ maps any vector into the null space of $G_a$. Hence, $d_h$ is in the null space and is a homogeneous vector of contact forces. Typically, $d_h$ satisfies the inequalities—the friction cone inequalities and the positivity constraints.

If the set of contact points with the specified coefficients of friction cannot resist the external wrench, then there is no feasible solution to the underlying force optimization problem. In this case, $d_h$ does not satisfy the inequalities. It is also possible that there is a solution, but that $d_h$ fails to satisfy the inequalities, although in practice this rarely occurs. In the case where $d_h$ does not satisfy the inequalities, a penalty is returned from the computation.

In the typical case, where $d_h$ satisfies the inequalities, a multiple of $d_h$ is used as the homogeneous solution. To compute this multiple, it is first shown how the multiple is computed for each of the contact points individually. Consider the kth contact point, k. The components of the particular solution can be written as $p_k = [s_{kx}, s_{ky}, q_k]$ View each friction cone inequality as a cone in 3-space.

$x^2 + y^2 \leq \mu^2 * z^2$, $0 \leq z$ where x, y, and z are identified with the first, second, and third components of a contact vector. Suppose that the particular solution $p_k$ satisfies the friction cone inequalities and the positivity constraints. Then $p_k$ is inside this cone and the required multiple for $h_k$ is zero.

Otherwise, let $g_k$ be a positive scalar and view $p_k + g_k * d_{hk}$ as a ray in 3-space. Seek the smallest $g_k$ such that $p_k + g_k * d_{hk}$ is inside the cone. For an arbitrary $d_{hk}$, there are three possible cases: (1) the ray may intersect the cone at a single point, grazing it at its edge; (2) the ray may intersect the cone at two points; (3) the ray may not intersect the cone.

However, if $d_{hk}$ satisfies the inequalities, then only cases (1) and (2) can arise. To see this, let $d_{hk} = [t_{kx}, t_{ky}, r_k]$. The contact force vector, $p_k + g_k * d_{hk}$, may be written as $[s_{kx}, s_{ky}, q_k] + g_k * [t_{kx}, t_{ky}, r_k]$ The friction cone inequality for $p_k + g_k * d_{hk}$ may be written as $(s_{kx} + g_k * t_{kx})^2 + (s_{ky} + g_k * t_{ky})^2 \leq \mu_k^2 * (q_k + g_k * r_k)^2$ When $g_k$ is sufficiently large, the inequality is dominated by the terms containing $g_k$. Since $d_h$ satisfies the inequalities, $t_{kx}^2 + t_{ky}^2 \leq \mu_k^2 * r_k^2$ which proves the friction cone inequality for the contact force vector with a suitably large value of $g_k$.

In case 1, there is a unique solution for $g_k$. In case 2, there are two possible value of $g_k$ and the smaller one is sought, as this is the $g_k$ corresponding to the intersection of the ray nearer to the point $p_k$. The condition for the ray to intersect the cone is $(s_{kx} + g_k * t_{kx})^2 + (s_{ky} + g_k * t_{ky})^2 = \mu_k^2 * (q_k + g_k * r_k)^2$ The system solves the equality for $g_k$. To simplify the notation, the k can be dropped from the subscript. For a given k, The system computes the terms $a = s_x * t_x + t_y * s_y - \mu^2 * q * r$ $b = (-2 * \mu^2 * s_x * t_x * q * r - 2 * \mu^2 * q * r * t_y * s_y + 2 * s_x * t_x * t_y * s_y - t_x^2 * s_y^2 - t_y^2 * s_x^2 + \mu^2 * t_y^2 * q^2 + \mu^2 * t_x^2 * q^2 + \mu^2 * r^2 * s_x^2 + \mu^2 * r^2 * s_y^2)$ $d = (t_x^2 + t_y^2 - \mu^2 * r^2)$ and uses these to compute the two roots $g_a = -(a - b^{1/2})/d$ $g_b = -(a + b^{1/2})/d$ The requirement that normal forces be positive is $0 \leq (q + g * r)$ The system chooses the smaller of the two g's that cause this equation to be satisfied.

Let $g_k$ be the solution for g for the kth contact point. The system carries out this procedure for each of the values of k, thereby computing $g_1, \ldots, g_N$. The system then computes the homogeneous scaling factor $g_{Max}$ as $g_{Max} = \max(g_1, \ldots, g_N)$ The general solution $c_{Approx}$ is computed as $$c_{Approx} = p_a + g_{Max} * d_h$$

By this construction, the system insures that the vector of contact forces, $c_{Approx}$, is a feasible solution. It can be computed rapidly since it entails only computing the inverse of $G_a$ and simple operations on relatively small matrices and vectors. Moreover, it is a good shape approximating function.

The third embodiment uses this solution to compute the grid minima and in local optimization. At each of the minimum values found in local optimization, it computes the optimal finger forces using the exact function.

Operation of the Third Embodiment

The operation of the third embodiment is similar to that of the first embodiment. In the interest of conciseness, only the major differences are described. The suffix A is used in order to distinguish the procedures of this embodiment from those of the first embodiment.

ForceOptA: ForceOptA is used in place of ForceOpt, except as described below. The procedure ForceOptA takes as input a set of contacts, a set of contact normals, and an external wrench. It computes a feasible solution as described in the preceding section.

LocalSearchA: LocalSearchA proceeds as follows.
(1) It operates as does LocalSearch to find a local minimum, using ForceOptA.
(2) When it has found a local minimum in this way, it calls QualityOfPCC to evaluate the objective function using the exact objective function computed by ForceOpt.

Fourth Embodiment

In many applications of interest, the wrench space is irregular. A case of particular practical importance is the set of wrenches that would occur if the object were moved along a specific trajectory. In this case, the wrench at each point along the trajectory is the sum of the wrench due to gravity, the wrench due to acceleration, and possibly a wrench due to contact. The trajectory gives rise to a "wrench trajectory function", which specifies the external wrench at each point in time over the interval from the start of the trajectory to its end. It is useful to be able to compute a desirable palm grasp that will restrain the object for all the values of such a wrench trajectory function. Let w(t) be such a wrench trajectory function and $w_k$, $k \in [1 \ldots n]$ be a discrete sampled version of w(t) with n samples. The fourth embodiment computes such desirable palm grasps given the sequence $w_k$.

This embodiment differs from the other embodiments in the way it solves the force optimization problem. Specifically, it operates in two steps: (1) It solves the force optimization problem for each $w_k$ computing a sequence $f_{opt, k}$. (2) It then takes the max over k of all the $f_{opt,k}$ values. This solves the force optimization problem for the trajectory wrench sequence. This solution is used, as described above, in computing desirable grasps.

This technique can be used in conjunction with other variations described above. In particular, it may be advantageously employed with using the shape approximating function described above, since computing $f_{opt,k}$ for multiple wrenches $w_k$ can be done very rapidly.

Alternative Embodiments and Implementations

The invention has been described above with reference to certain embodiments and implementations. Various alternative embodiments and implementations are set forth below. It will be recognized that the following discussion is intended as illustrative rather than limiting.

Description of an Object's Surface

In the above embodiments, an object's surface is described by a collection of surface patches, as discussed above. In alternative embodiments, an object's surface may be described in other ways. In one group of alternative embodiments, a different representation may be chosen for surface patches. For example, the boundary may be represented by one or more analytical functions, which may be a collection of straight lines, or a b-spline, or any other collection of curves. In other alternative embodiments, the surface patches may be represented by other analytic functions such as Bezier patches. In other alternative embodiments, the surface patches may be represented by a mesh of discrete triangles or other discrete polygons, or by a mixture of techniques, for example using analytic functions for portions of the surface and meshes of discrete polygons for other portions. In still other alternative embodiments, the object's surface may be represented without using surface patches, for example, by a point cloud or by a polygonal mesh for the entire object.

Kinematic Description of a Robotic Hand

In the above embodiments, the robotic hand has an extendable palm and four fingers, each with a single joint. In alternative embodiments, the robotic hand described may be more or less complex; the method described herein may be used to plan desirable grasp configurations for such alternative hands.

In alternative embodiments, the palm may be extendable in other ways. It may be extendable in directions other than normal to the palm surface, may be actuated in more than one degree of freedom, thereby adding dimensions to the palm contact configuration space, or may be a composite palm, composed of multiple movable linked contact surfaces configured to work cooperatively.

The palm may not be extendable. In this case, a hand configuration in which the palm is in contact with the object has 3 degrees of freedom (rather than 4 which is the case when the palm is extendable). Loosing this degree of freedom reduces the search space and, in general, leads to less desirable grasps.

Each finger may be equipped with two or more joints all coupled so that a single actuator can move multiple joints. The corresponding alternative embodiments compute the intersection of the finger with a surface patch according to the curve in space traced by the coupled joint.

The hand may have more or fewer fingers. Each finger may have additional, or alternative contact points. For example, the sides of the fingers may be used as contact points.

One or more of the fingers may be equipped with more than one independently actuated joint. In this case, a hand pose does not uniquely determine a grasp configuration, because the several joints of each finger allow the finger to attain a set of contact points. The corresponding alternative embodiments perform an additional search over the possible set of contact points.

In the above embodiments, the palm has a flat contact surface. In alternative embodiments, the palm surface may be curved. In this case, the alternative embodiment considers the curvature of the corresponding surface patch when computing the palm contacts.

Multiple Hands

In the above embodiments, grasp planning is performed for a single hand. However, in alternative embodiments grasp planning may be performed for two or more hands. This may be done in several ways.

In one alternative embodiment, grasp configurations for each hand may be computed in a serial fashion. First, a grasp configuration is computed for the first hand. Then, holding this configuration fixed, a grasp configuration is computed for the second hand, and so on, until a grasp configuration is computed for each hand. In this embodiment, the force optimization problem is computed taking into account all of the contact configurations previously computed. Thus, force optimization would be performed simultaneously for all of the hands in contact with the object.

In a second alternative embodiment, the optimal grasp configuration for two or more hands may be computed simultaneously. In this case, for n hands, the space of hand configurations would be of dimension 3*n, 4*n, 5*n, or 6*n depending on whether the hands in question have moveable palms and/or on whether the object is constrained to contact the hand at the center. In this case, both search and force optimization is performed simultaneously for all hands in question.

In a third alternative embodiment, the search may proceed in parallel, but assume a simplified kinematic model for all but one hand. The simplified kinematic model may include a subset of the contact surfaces of the hand. For example, if the hand is reduced to be only a palm, calculations related to the fingers do not need to be performed, thus improving the speed of the search. The search may then proceed either serially or in parallel as described above.

In a fourth alternative embodiment, the hands may be coupled to reduce the number of degrees of freedom. For example, given two hands it is natural to approach the object from opposite directions. By enforcing this constraint, the dimensionality of the joint hand configuration space is reduced considerably.

Hands with Multiple Palms

In the above embodiments, grasp planning is performed for a hand with a single palm. In alternative embodiments, grasp planning may be performed for a hand with two or more palms. One embodiment for so doing is as follows: A first palm is designated as the primary palm and used in forming the palm contact configuration space. The other palms are each actively movable in one dimension; the joint variables for these palms are computed by finding the value such that these palms are in contact with the object. Still other embodiments may consider two or more palms simultaneously.

Contact of the Palm with a Surface Patch

In the above embodiments, the palm is constrained to contact a surface patch so that the center of the palm is the contact point in rigid contact and the center of the palm is normal to the surface at that point. In alternative embodiments, the contact point may be anywhere on the palm. This increases the search space by two additional degrees of freedom when the palm is in contact with a convex surface patch.

Model of Friction

In the above embodiments, the static coefficient of friction at contact point k is taken to be, $\mu_k$. Physically, the static coefficient of friction depends upon many factors. These include the two surfaces in contact, but may also include other factors such as atmospheric dust and humidity, temperature, vibration, and extent of contamination. Various embodiments may consider one or more of these factors in computing the coefficients of friction.

In the above embodiments, friction is modeled by considering only tangential friction. In alternative embodiments, it is possible to consider torsional friction as well. The combination of tangential friction with torsional friction may be modeled in various ways.

External Wrenches

In the first, second, and third embodiments above, a single external wrench is considered; in the fourth embodiment, a set of wrenches is considered, as defined by a "trajectory wrench function". The technique of the fourth embodiment may be employed by other alternative embodiments to other irregular wrench spaces. In general, the technique is: (1) Sample the task wrench space. (2) Compute $f_{opt}$ for each wench in the sample by solving the force optimization problem, as described in the exemplary embodiments. (3) Take the maximum over all the $f_{opt}$ values so computed.

Other alternative embodiments may consider the set of all possible wrenches. In this case, a suitable quality measure may be obtained by considering the set of all wrenches that can be generated by a grasp where no more than a given force is applied at any contact. This forms a solid in wrench space. A quality measure is then the minimum distance from the center to the edge of the solid. This may be interpreted as the largest wrench magnitude such that all external wrenches with that magnitude or less can be resisted.

Uncertainty

In the above embodiments, it is assumed that the location of the object and the center of mass is given. Alternative embodiments may handle the situation in which there is uncertainty about either of these.

If the value of the uncertain quantity is known to lie within certain bounds, the method may use the technique described for a trajectory wrench function. In the general case, the bounded space is sampled and the force optimization problem is solved for each point in the sample. The objective function used in grasp selection is the maximum over the sampled values. If the sampling is sufficiently dense, the resulting grasp is robust in that regardless of the value of the unknown quantity, the situation will not be worse than the one planned for. Special cases may exploit special properties of the situation to refine the sampling.

For example, suppose that the center of mass is uncertain, but is known to lie in a convex volume. This involves no loss of generality, since the center of mass of an object clearly lies within the object's convex hull. Typically the center of gravity is known to be within a far smaller convex Volume. Let the convex volume be defined by the set of vertices $\{v_1 \text{-} v_n\}$. An alternative embodiment may compute desirable grasps as follows: Let $f_{opt}(w)$ be the value of the objective function for the force optimization problem as a function of the wrench w. For each vertex $v_j$, the method computes a gravity wrench $w_j$. It solves the force optimization problem for each wrench $w_j$, resulting in $f_{opt}(w_j)$. It computes $f^*_{opt} = \max(j) f_{opt}(w_j)$. It uses $f^*_{opt}$ in the optimization over hand configurations. Let p be any point in the convex volume and let w be the corresponding wrench w. Then $f_{opt}(w) \leq f^*_{opt}$. Hence, the grasps so produced are robust in the sense that they will be desirable under the worst-case position of the center of mass.

Quality Measure—Contact Forces

The above embodiments consider the largest force that any contact must apply to balance an external wrench. In various alternative embodiments, other criteria may be applied.

The above embodiments consider the magnitude of the force at each contact, where all the components of the force vector are treated equally. In alternative embodiments, it would be possible to consider only the force normal to the surface at the point of contact, only the force along the line of action, which would correspond to the torque the joint actuator needs to apply, or only the force perpendicular to the line of action, which would correspond to the force imposed on the structure. Alternatively, it would be possible to consider some weighted sum of the above forces.

The above embodiments compute the various objective functions by taking the maximum of the force magnitudes of the several contact points. In alternative embodiments, it is possible to consider different ways of combining the forces on the contact points. For example, it is possible to consider the sum of the normal forces. In this case, the objective is $r^T *c$, where r is a vector that selects out the normal components of the contact force vector c. Note that this combined with the inequalities is a second-order cone problem.

In still other embodiments, other norms of the magnitude of the contact forces at the several contact points may be used. For example, it would be possible to use the so-called "$L_2$ norm", which computes the sum of the squares of the individual magnitudes. Alternatively, it would be possible to use the so-called "$L_1$ norm", which computes the sum of the absolute values of the individual magnitudes. Each of these alternatives is some norm of the magnitude of the contact forces at the several contact points.

In the above embodiments all contacts were reduced to point contacts, allowing the force optimization criterion to involve only forces. However, in alternative embodiments it would be possible to instead include torque values in the objective function and/or to include constraints on torque in the force optimization process. In this case, some contacts would exert force or torque or both.

It will be seen that there are many ways in which a set of contact forces may be evaluated to compute a quality measure. Each way may be used in alternative embodiments for various applications.

Quality Measure—Friction Cone Considerations

In the above embodiments, a grasp is disallowed if the angle $\Phi_k$ between the direction of force applied by contact k and the surface normal fails to meet the friction cone constraint, i.e. tan $\Phi_k \leq \mu_k$. In alternative embodiments, it is possible to additionally prefer grasps in which all the contact forces are well within the friction cone. This may be done by penalizing grasps in which contact points are close to the friction cone boundary, by multiplying each contact force by a suitable factor or by adding a suitable term. In other alternative embodiments, the requirement that tan $\Phi_k \leq \mu_k$ may be dropped, provided that the grasp is stable when the external torques are considered; in this case, additional control is required when the contact forces are applied.

Computing the Quality Measure—Constraints on the Representative Palm Contact Points In the above embodiments, the representative palm contact points are constrained to have a force distribution as described above. In alternative embodiments, the force distribution may be other linear or nonlinear functions of the locations of the representative contact points.

In the second embodiment above, strict equality was enforced on soft point contacts. If the curvature was small, however, it was viewed as planar and the contacts were only required to satisfy the planarity constraint.

In alternative embodiments, the constraints on soft contact points might gradually progress from equality to linearity constraints. To do so, the representative points would be duplicated. One set of representative points would be forced to be equal, and one set only required to satisfy planarity. In addition a "blending value" $0 < \lambda < 1$ would be chosen (note that the extreme cases of $\lambda=0$ and $\lambda=1$ will correspond to only equality or only planarity constraints). Suppose that $f_1 \ldots f_4$ are the applied forces at the first four representative points which are enforced to be equal, and $f_5 \ldots f_8$ are the remaining four enforced to be planar. It is required that the total force F is apportioned as $$\lambda * F = f_1 + f_2 + f_3 + f_4 \text{ and } (1-\lambda)*F = f_5 + f_6 + f_7 + f_8$$

or equivalently $(1-\lambda)*(f_1+f_2+f_3+f_4)=\lambda*(f_5+f_6+f_7+f_8)$. This constraint can again be represented as vector ρ with entries of $\lambda$ and $(1-\lambda)$ on the appropriate components so that $\rho^T * c = 0$ for a force optimization solution c. Thus, an augmented grasp matrix $G_a$ and associate vector $w_a$ can be formed to represent this constraint. The blending value λ can be chosen based on the curvature of the object (e.g. $\lambda=\min(1, t_x * t_y)$), the location of the representative point, or other suitable functions that move smoothly from a highly curved to a planar object.

In another alternative embodiment, a fine grid of representative points on the palm surface might be chosen. The force exerted by a representative point would be proportional to the depth of depression at each point, or zero if the point was not in contact. That is, for a given applied force F, and representation point locations $(x_i, y_i)$, i=1 ... n, the equation $$F = -E/T * \Sigma_i \min(0, (t_x * x_i^2 + t_y * y_i^2)/2 - d)$$

would be solved for d. The tangential torque would then be estimated as $$G = -\mu * E/T \Sigma_i (x_i^2 + y_i^2)^{1/2} \cdot \min(0, (t_x * x_i^2 + t_y * y_i^2)/2 - d)$$

In the second embodiment, a simple linear constraint was employed among contact points. In general, the force characteristics of the material may be nonlinear.

As before, let $p_i = (x_i, y_i, f_i)$ represent the palm location and applied force of a representative contact point. In one form of the force constraints, the resulting constraint for contact point j is $$\Sigma_i f_i * D_i(x_1, y_1, \ldots x_n, y_n) + a_o = 0$$

Let $\rho_j$ be the row formed from the components $D_1 \ldots D_n$ arranged as in the exemplary embodiment to choose the correct components of the solution to the force optimization problem, c. Now the constraint takes the form $\rho_j^T c = -a_0$. Produce $G_a$ from G as described in the first embodiment using the row $\rho_j$. Let corresponding entry of $w_a$ be $-a_0$. This may be repeated for all other contact locations.

The methods described in the second embodiment may now be applied to the resulting $G_a$ and $w_a$. An example of this is a force profile that is some function of the distance from the contact point, including a quadratic function, a cubic function, or any polynomial function.

Even more generally, the constraint in question may be a nonlinear function of applied force. Suppose the constraint for contact point j is $H_j(p_1, p_2, \ldots p_n)=0$. Given a set of contact locations and a nominal solution, c, to the force balance equation, this constraint can be expanded in a Taylor series about this nominal solution to produce a linear constraint on force values of the form $$\Sigma_i f_i * (\partial H_j / \partial f_i) = 0$$

Again, a row vector $\rho_j$ is formed from the components $(\partial H/\partial f_i)$ as described above. If there are several such constraints, a row is produced for each and this row is added to the grasp matrix G to produce the augmented grasp matrix $G_a$ and augmented vector $w_a$. In the above embodiments, $G_a$ did not change for a given contact location. If, however, $G_a$ now depends on the nominal force solution c, it must be updated every time the force optimization problem is solved.

Computing the Quality Measure—Compliance

In the second embodiment, the palm is covered with a compliant pad. Alternative embodiments may use compliance in a variety of ways.

In some alternative embodiments, the entire palm may be compliant. In this case, the "pad" is effectively the entire palm. In other alternative embodiments, fingertip compliance may also be considered. Each fingertip may be modeled as an ellipsoid made of an elastic material. The model may be specified by the two radii of curvature of each fingertip, the thickness of the elastic material, and its modulus of elasticity. The computation of the fingertip deformation may be done in a fashion similar to the deformation of the palm described in the second embodiment. This results in several representative contact points for each fingertip. Collectively, these increase the torque that can be resisted by each fingertip.

In other alternative embodiments, compliance of the object may be considered. As an example, if the curvature of some surface patch is large compared to the curvature of the fingertips, it may be locally approximated as being planar. If it is compliant, an alternative embodiment may treat the compliance as follows: Each fingertip may be modeled as a rigid ellipsoid. The technique used by the second embodiment may be applied, since a flat deformable surface is in contact with a rigid convex surface. In the second exemplary embodiment, several approximations are used in computing the contact area. In alternative embodiments, various other approximations may be used. For example, rather than consider two radii of curvature, a single radius of curvature may be used provided that is chosen to make the resulting computation conservative.

Computing the Quality Measure—Checking Attainability

The above embodiments compute desirable grasp configurations under the simplifying assumption for attainability as described above. In alternative embodiments, it may be desirable to modify the computation so that the grasp configurations that result are ones that avoid collisions with obstacles that may be present in the environment. In other alternative embodiments, it may be desirable to choose grasp configurations that are at least a minimum distance from the nearest obstacle. Such requirements imposed by obstacles may be achieved by imposing a penalty for collisions or near collisions. Such penalties may be treated analogously to the penalty imposed when a finger does not make contact.

In still other alternative embodiments, it may be desirable to weight a grasp configuration by the distance from the nearest obstacle, in order to prefer grasps with large safety margins. Such requirements imposed by obstacles may be achieved by including, in the objective function, additional terms or factors that are chosen to be large when the requirements are violated or close to being violated. These terms or factors can be interpreted as an artificial force field whose effect is to push the grasps away from undesirable places in the grasp space.

Alternative embodiments could consider the kinematics of the arm to which the hand is attached and check the ability of the arm to position the hand at the specified hand pose. If a pose is not attainable, a penalty is computed.

Computing the Quality Measure—the Force Optimization Problem

Several of the above embodiments solve the force optimization problem using a standard second-order cone solver. Alternative embodiments may use other techniques to solve the force optimization problem.

In some alternative embodiments, it is possible to set up the problem as a second-order cone problem and use a solver specialized to take advantage of the particular requirements of this invention. For example, many solution techniques require a feasible starting point. In this invention, the approximation $c_{Approx}$ computed by the third embodiment may be used, for it is a quickly computed feasible solution.

In other alternative embodiments, it is possible to solve the force optimization problem by other techniques. Recall that $c_k$ denotes the force vector applied by the kth contact point. The objective function is $$f_{obj} = \max(k)(\|c_k\|)$$

It is sought to minimize this over all feasible contact force vectors, c. Since $c = p + \text{Null}(G_a)*\lambda$, the minimization over c is a minimization over $\lambda$. Writing $c_k$ as $c(\lambda)_k$ makes explicit the functional dependence of $c_k$ on $\lambda$ $$f_{obj}(\lambda) = \max(k)(\|c(\lambda)_k\|)$$

It is sought to minimize this over all values of $\lambda$ such that c is feasible.

This optimization can be performed using a numerical non-linear optimizer to minimize over $\lambda$ subject to the inequality constraints stated above. While the objective function is non-linear, it is convenient to have the inequality constraints expressed by a linear inequality. This is done by linearizing the friction cone constraints, as described in standard works on grasping.

Various non-linear optimizers may be used by various alternative embodiments. Note that some non-linear optimizers take as input an initial estimate for $\lambda$. In these cases, a suitable initial value is often the optimal value of $\lambda$ computed in a prior call in a local search.

Alternatively, the objective function may be expressed as a vector $$[\|c_1\|, \|c_2\|, \ldots, \|c_N\|]$$

and a minimax optimizer may be applied to minimize the maximum component of this vector.

In still other alternative embodiments, it is possible to use the framework of general non-linear optimization to solve the force optimization problem for other objective functions. For example, suppose the objective function is taken to be the sum of the magnitudes of all the contact forces. The objective function is then $$f_{objSum}(\lambda) = \Sigma_k(\|c(\lambda)_k\|)$$

This objective function, $f_{objSum}$, can be computed using the same numerical non-linear optimizer.

Computing the Quality Measure—Shape Approximating Functions

The second embodiment computes a shape approximating function and uses it to find approximate local minima as described above. Alternative embodiments could employ various other shape approximating functions.

In the third embodiment, the vector $d_h$ is required to satisfy the positive normal force and friction cone inequalities. While this condition is sufficient to insure that some multiple of $d_h$ plus a particular solution is feasible, this condition is not necessary. Alternative embodiments may omit checking $d_h$, and instead make several additional checks in computing $g_{Max}$, e.g., checking that the term b is non-negative before taking its square root.

In other alternative embodiments, the vector cV may be computed in a variety of different ways: The components denoted as cFinger may be obtained by computing equilibrium forces in a preferred direction. Also, the components denoted as cPalm may be obtained by a different weighting of fParallel and fTangential.

In general, the choice of cV comes from a consideration of the hand geometry. Observe that the solution to the force optimization problem is $$f_{obj} = \min(\lambda)\max(k)(\|c_k(\lambda)\|)$$

Let $\lambda$ be the solution for some situation. The corresponding vector of contact forces is $c = p + \text{Null}(G_a)*\lambda$, so that the homogeneous solution is $h = \text{Null}(G_a)*\lambda$. The vector h specifies the direction in the null space that is the best direction for that situation. Consider that direction as a function of the situation. A good choice for cV is one that is close to h over the ensemble of situations that are admitted by the hand geometry. In alternative embodiments, these considerations may be employed in choosing the method used to construct cV. Suppose, for example, that the hand has three fingers (rather than the four of the above embodiments) and suppose that the fingers were indexed so the finger 1 acted as a thumb, opposing the other two. Suitable values for cF would be $$cF_1 = [0,0,1]^T$$

$$cF_k = [0,0,\tfrac{1}{2}]^T \text{ for } k=2,3$$

In other alternative embodiments, multiple choices of cV may be made. For each cV, a corresponding $d_h$ is computed. From such $d_h$ the value $f_{obj}(d_h)$ is computed. The minimum of these is the value of the objective function.

In still other alternative embodiments, shape approximating functions obtained from other considerations may be used. For example, other alternatives could sample the objective function, construct a smooth function from the samples, and use the smooth function as a shape approximating function.

Alternative Quality Measures

The second embodiment computes a shape approximating function and uses it to find approximate local minima as described above. Alternative embodiments could employ alternative quality measures specially chosen to facilitate fast computation. For example, it would be possible to choose quality measures that are fast to compute, whose first derivatives are fast to compute, or whose second derivatives are fast to compute, or any combination thereof. These might be used in conjunction with specific local search techniques.

Surface Patches Considered

In the above embodiments, concave surface patches are not considered for use as palm contact surfaces. Alternative embodiments may consider concave patches. The contact points would be the locations where the edge of the palm makes contact with the patch.

Surface Regions Considered

In the above embodiments, a grasp may be made anywhere on an object's surface subject to limitations described above. In certain applications, it may be useful to impose additional restrictions on the portion of an object's surface to be considered. As one example, if an object is to be grasped and one end inserted into a fixture, it may be useful to prohibit grasps near that end. Alternative embodiments may accept restrictions on the surface patches or portions of surface patches allowed in a grasp and may compute desirable grasps subject to such restrictions.

Searching the Space of Hand Configurations

In the above embodiments, the search in the space of hand configurations is carried out by searching the space of palm contact configurations. In alternative embodiments, it would be possible to parameterize the space of hand configurations in some other way and to search that parameterization.

In the above embodiments, the search in the space of hand configurations returns a list of grasp force configurations. Alternative embodiments might trim this list or might return more or less information for each item on the list.

Local Search

In the above embodiments, local search is carried out by a hill-climbing technique. In alternative embodiments, it would be possible to carry out the search with other optimization techniques. Techniques in common use include conjugate gradient, the interior trust region approach, sequential quadratic programming, and the BFGS quasi-Newton method. There are many other optimization techniques that may be used in alternative embodiments.

Application to Precision Grasps

Several of the techniques described in this invention may be beneficially used in precision grasps. In particular, shape approximating functions, as described in the third exemplary embodiment, may be used in computing precision grasps.

Application of the Grasp Plans Computed by the Invention

The methods described herein may be used in a robotic system to plan desirable grasps to be executed immediately. Alternatively, they may be used off-line to plan desirable grasps to be executed at some future time. In this way, it is possible to construct a database of objects and associated desirable grasps. When the object is recognized, the list of desirable grasps for that object is retrieved and a grasp is selected from the list.

Alternatively, the invention may be used to compute desirable grasps for a hand that is being designed, with the grasps so computed being used to assess potential hand designs. In this way, a hand can be designed that is well suited for its intended use.

It will be recognized that this list is intended as illustrative rather than limiting and that the methods described herein can be utilized for varied purposes.

Computer Implementation of Procedural Steps

The procedural steps of the above embodiments have been described. They may be implemented in a variety of programming languages, such as C++, C, Java, Ada, Fortran, or any other general-purpose programming language. These implementations may be compiled into the machine language of a particular computer or they may be interpreted. They may also be implemented in the assembly language or the machine language of a particular computer. The method may be implemented on a computer executing program instructions stored on a computer-readable medium.

The procedural steps may also be implemented in specialized programmable processors. Examples of such specialized hardware include digital signal processors (DSPs), graphics processors (GPUs), media processors, and streaming processors. The procedural steps may also be implemented in electronic hardware designed for this task. In particular, integrated circuits may be used. Examples of integrated circuit technologies that may be used include Field Programmable Gate Arrays (FPGAs), gate arrays, standard cell, and full custom.

Implementation using any of the methods described in this invention disclosure may carry out some of the procedural steps in parallel rather than serially.

CONCLUSION, RAMIFICATIONS, AND SCOPE

In summary, a method of computing desirable palm grasps of general objects is described. The method is able to compute desirable palms grasps for objects with general surfaces, grasps for both hands having fixed palms and hands having actuated palms. It is able to compute desirable palm grasps for both rigid contact and compliant contact, and exact solutions of the force optimization problem as well as approximate solutions. The invention is also able to consider many classes of external wrenches.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

The invention claimed is:

1. A method for automatically grasping an object with a desirable palm grasp, comprising the steps of:
receiving at a processor as an input a description of the surface of an object, said object and description each being of an arbitrary 3D shape not restricted to a fixed set of shape primitives;
automatically selecting by the processor a plurality of grasp configurations of a robotic hand, the robotic hand comprising a palm and one or more fingers, each grasp configuration specifying a hand configuration and joint variables of the hand, and contact points for the palm and fingers on the object's surface as so described;
receiving at the processor as an input a coefficient of friction at each of the contact points in the selected grasp configurations;
receiving at a processor as an input a description of a specific external wrench that applies to the object;
computing by the processor a quality measure for each selected grasp configuration representing an ability of the robotic hand to hold the object against the specific external wrench in the selected grasp configuration;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the palm and fingers of the robotic hand.

2. The method of claim 1, wherein the step of selecting a plurality of grasp configurations is accomplished by searching over a space of hand configurations.

3. The method of claim 1, wherein the step of selecting a plurality of grasp configurations is accomplished by searching over a space of palm contact configurations.

4. The method of claim 3, wherein the palm of the robotic hand is actively movable, and the step of selecting a plurality of grasp configurations is accomplished by searching over a space of palm contact configurations that include variation of the extension of the palm.

5. The method of claim 1, wherein the robotic hand further comprises one or more compliant contact surfaces of the hand.

6. The method of claim 5, wherein a surface of the palm is a compliant contact surface.

7. The method of claim 5, wherein the step of computing the quality measure further comprises modeling by the processor small linear deformations to represent the one or more compliant contact surfaces of the hand.

8. The method of claim 7, wherein the modeling of small linear deformations to represent the one or more compliant contact surfaces further comprises using representative contact points that collectively approximate the contact force exerted by the one or more compliant contact surfaces.

9. The method of claim 1, wherein the step of receiving a description of the object's surface further comprises acquiring a description of one or more complaint contact surfaces of the object.

10. The method of claim 9, wherein the step of computing the quality measure further comprises modeling small linear deformations to represent the one or more compliant contact surfaces.

11. The method of claim 10, wherein the modeling of small linear deformations further comprises using representative contact points that collectively approximate the contact force exerted by the one or more compliant contact surfaces.

12. The method of claim 1, wherein the step of computing the quality measure of each grasp configuration further comprises solving by the processor a force optimization problem, in which an optimal set of contact forces is determined for the selected contact points, their coefficients of friction, and the external wrench.

13. The method of claim 12, wherein the step of solving the force optimization problem further comprises using convex optimization techniques.

14. The method of claim 13, wherein the step of solving the force optimization problem further comprises using a second-order cone solver.

15. The method of claim 12, wherein the step of solving the force optimization problem further comprises using non-linear optimization.

16. The method of claim 1, further comprising a step of receiving by the processor a model of other objects and their locations, and wherein the step of computing the quality measure further comprises avoiding collisions or near collisions with the other objects.

17. The method of claim 1, further comprising a step of receiving by the processor a model of a robotic arm used to position the hand, and wherein the step of computing the quality measure further comprises evaluating the ability of the arm to position the hand at the selected hand configuration.

18. The method of claim 1, wherein the step of selecting a plurality of grasp configurations further comprises the steps of: selecting by the processor a sample of grasp configurations from the space of grasp configurations; computing by the processor a quality measure for each of the sample grasp configurations; comparing by the processor the quality measures for each of the sample grasp configurations to determine a subset of the sample grasp configurations having desirable quality measures; searching by the processor a space of grasp configurations around the subset of sample grasp configurations to find a local minimum of the quality measure for each grasp configuration in the subset; and comparing by the processor the local minima of the quality measures of the subset of sample grasp configurations.

19. The method of claim 1, wherein the palm of the robotic hand is actively movable.

20. The method of claim 1, further comprising the step of selecting by the processor a grasp configuration of a second robotic hand, and wherein the step of computing the quality measure further comprises computing by the processor the ability of both robotic hands to hold the object against the external wrenches.

21. The method of claim 1, wherein the contact points of the palm are computed by treating the palm and object as rigid and wherein the contact points are determined by a contacted surface shape.

22. A non-transitory computer-readable medium comprising program instructions for automatically grasping an object with a desirable palm grasp, comprising the steps of:
receiving at a processor as an input a description of the surface of an object, said object and description each being of an arbitrary 3D shape not restricted to a fixed set of shape primitives;
automatically selecting by the processor a plurality of grasp configurations of a robotic hand, the robotic hand comprising a palm and one or more fingers, each grasp configuration specifying a hand configuration and joint variables of the hand, and contact points for the palm and fingers on the object's surface as so described;
receiving at the processor as an input a coefficient of friction at each of the contact points in the selected grasp configurations;
receiving at the processor as an input a description of a specific external wrench that applies to the object;
computing by the processor a quality measure for each selected grasp configuration representing an ability of the robotic hand to hold the object against the specific external wrench in the selected grasp configuration;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the palm and fingers of the robotic hand.

23. A method for automatically grasping an object with a desirable precision grasp, comprising the steps of:
receiving at a processor as an input a description of the surface of an object, said object and description each being of an arbitrary 3D shape not restricted to a fixed set of shape primitives;
automatically selecting by the processor a plurality of grasp configurations of a robotic hand, the robotic hand comprising a plurality of fingers, each grasp configuration specifying a hand configuration and joint variables of the hand, and contact points for the fingers on the object's surface as so described;
receiving at the processor as an input a coefficient of friction at each of the contact points in the selected grasp configurations;
receiving at the processor as an input a description of a specific external wrench that applies to the object;
computing by the processor a quality measure for each selected grasp configuration representing an ability of the robotic hand to hold the object against the specific external wrench in the selected configuration by solving a force optimization problem;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the fingers of the robotic hand.

24. The method of claim 23, wherein the step of selecting a plurality of grasp configurations further comprises the steps of:
selecting by the processor a sample of grasp configurations from the space of grasp configurations;
computing by the processor a quality measure for each of the sample grasp configurations;
comparing by the processor the quality measures for the sampled grasp configurations to determine a subset of the sampled grasp configurations having desirable quality measures;
searching by the processor a space of grasp configurations around the subset of sampled grasp configurations to find a local minimum of the quality measure for each such grasp configuration in the subset; and
comparing by the processor the local minima of the quality measures of the subset of sampled grasp configurations.

25. A method for automatically grasping an object with a desirable precision grasp, comprising the steps of:
receiving at a processor as an input a description of the surface of an object, said object and description each being of an arbitrary 3D shape not restricted to a fixed set of shape primitives, said object and description each including one or more compliant surfaces;
automatically selecting by the processor a plurality of grasp configurations of a robotic hand, the robotic hand comprising a plurality of fingers, each grasp configuration specifying a hand configuration and joint variables of the hand, and contact points for the fingers on the object's surface as so described;
receiving at the processor as an input a coefficient of friction at each of the contact points in the selected grasp configurations;
receiving at the processor as an input a description of a specific external wrench that applies to the object;
computing by the processor a quality measure for each selected grasp configuration representing an ability of the robotic hand to hold the object against the specific external wrench in the configuration;
comparing by the processor the quality measure of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the fingers of the robotic hand.

26. A system for automatically grasping an object with a desirable palm grasp, comprising:
a robotic hand comprising a palm and one or more fingers;
a processor configured to:

receive as an input a description of the surface of an object, said object and description each being of an arbitrary 3D shape not restricted to a fixed set of shape primitives;

automatically select a plurality of grasp configurations of the robotic hand, each grasp configuration specifying a hand configuration and joint variables of the hand, and contact points for the palm and fingers on the object's surface as so described;

receive as an input a coefficient of friction at each of the contact points in the selected grasp configurations;

receive as an input a description of a specific external wrench that applies to the object; and compute a quality measure for each grasp configuration representing an ability of the robotic hand to hold the object against the specific external wrench in the selected grasp configuration;

compare the quality measure of each of the selected grasp configurations to determine which selected grasp configurations have the best quality measure;

choose one of the selected grasp configurations with the best quality measure; and command the robotic hand to grasp the object using the chosen grasp configuration by making contact between the object and the palm and fingers of the robotic hand.

27. The system of claim 26, wherein the palm is actively movable.

28. The system of 26, wherein the processor is further configured to receive as an input a kinematic description of a second robotic hand, and the processor computes a quality measure representative of the ability of both robotic hands to hold the object against the external wrenches.

29. The system of 26, wherein the robotic hand further comprises an additional palm.

30. The system of 29, wherein the additional palm is actively movable.

31. A method for automatically grasping an object with a desirable grasp, comprising the steps of:

receiving at a processor as an input a description of the surface of an object, said object and description each being of an arbitrary 3D shape not restricted to a fixed set of shape primitives;

automatically selecting by the processor a plurality of grasp configurations of a robotic hand, the robotic hand comprising a plurality of fingers, each grasp configuration specifying a hand configuration and joint variables of the hand, and contact points for the fingers on the object's surface as so described;

receiving at the processor as an input a coefficient of friction at each of the contact points in the selected grasp configurations;

receiving at the processor as an input a description of one or more external wrenches that may apply to the object;

for each grasp configuration, computing by the processor a set of first quality measures, one for each external wrench, representing an ability of the robotic hand to hold the object against each of the external wrenches;

for each selected grasp configuration, selecting by the processor a second quality measure which is the largest of the set of first quality measures for the selected grasp configuration;

comparing by the processor the second quality measures of all of the selected grasp configurations to determine which grasp configurations have the best second quality measure;

choosing by the processor one of the selected grasp configurations with the best second quality measure; and controlling by the processor the robotic hand to grasp the object using the chosen grasp configuration by making contact between the object and the fingers of the robotic hand.

32. The method of claim 31, wherein the step of computing the first quality measure for each grasp configuration further comprises solving by the processor a force optimization problem.

33. A system for automatically grasping an object with a desirable precision grasp, comprising:

a robotic hand comprising a plurality of fingers;

a processor configured to:

receive as an input a description of the surface of an object, said object and description each being of an arbitrary 3D shape not restricted to a fixed set of shape primitives;

automatically select a plurality of grasp configurations of the robotic hand, each grasp configuration specifying a hand configuration and joint variables of the hand, and contact points for the fingers on the object's surface as so described;

receive as an input a coefficient of friction at each of the contact points in the selected grasp configuration;

receive as an input a description of a specific external wrench that applies to the object; and compute a quality measure for each selected grasp configuration representing an ability of the robotic hand to hold the object against the specific external wrench in the selected grasp configuration by solving a force optimization problem;

compare the quality measure of each of the selected grasp configurations to determine which selected grasp configurations have the best quality measure;

choose one of the selected grasp configurations with the best quality measure; and command the robotic hand to grasp the object using the chosen grasp configuration by making contact between the object and the fingers of the robotic hand.

34. A system for automatically grasping an object with a desirable grasp, comprising:

a robotic hand comprising a plurality of fingers;

a processor configured to:

receive as an input a description of the surface of an object, said object and description each being of an arbitrary 3D shape not restricted to a fixed set of shape primitives;

automatically select a plurality of grasp configurations of the robotic hand, each grasp configuration specifying a hand configuration and joint variables of the hand, and contact points for the fingers on the object's surface as so described;

receive as an input a coefficient of friction at each of the contact points in the selected grasp configurations;

receive as an input a description of one or more external wrenches that may apply to the object;

compute for each selected grasp configuration a set of first quality measures, one for each external wrench, representing an ability of the robotic hand to hold the object against each of the external wrenches;

select for each grasp configuration a second quality measure which is the largest of the set of first quality measures for the grasp configuration;

compare the second quality measures of all of the selected grasp configurations to determine which selected grasp configurations have the best second quality measure;
choose one of the selected grasp configurations with the best second quality measure; and
command the robotic hand to the object using the chosen grasp configuration by making contact between the object and the fingers of the robotic hand.

35. A method for automatically grasping an object with a desirable palm grasp, comprising the steps of:
receiving at a processor as an input a description of the surface of an object, said object and description each being of an arbitrary 3D shape;
automatically selecting by the processor a plurality of grasp configurations of a robotic hand, the robotic hand comprising a palm and one or more fingers, each grasp configuration specifying a hand configuration and joint variables of the hand, and contact points for the palm and fingers on the object's surface as so described;
receiving at the processor as an input a coefficient of friction at each of the contact points in the selected grasp configurations;
receiving at the processor as an input a description of a specific external wrench that applies to the object;
computing by the processor a quality measure for each selected grasp configuration representing an ability of the robotic hand to hold the object against the specific external wrench in the selected configuration;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the palm and fingers of the robotic hand.

36. A method for automatically grasping an object with a desirable palm grasp, comprising the steps of:
receiving at a processor as an input a description of the surface of an object, said object being of an arbitrary 3D shape, and said description comprising one or more surface patches, point clouds or polygonal meshes;
automatically selecting by the processor a plurality of grasp configurations of a robotic hand, the robotic hand comprising a palm and one or more fingers, each grasp configuration specifying a hand configuration and joint variables of the hand, and contact points for the palm and fingers on the object's surface as so described;
receiving at the processor as an input a coefficient of friction at each of the contact points in the selected grasp configurations;
receiving at the processor as an input as an input a description of a specific external wrench that applies to the object;
computing by the processor a quality measure for each selected grasp configuration representing an ability of the robotic hand to hold the object against the specific external wrench in the selected grasp configuration;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the palm and fingers of the robotic hand.

37. A method for automatically grasping an object with a desirable precision grasp, comprising the steps of:
receiving at a processor as an input a description of the surface of an object, said object and description each being of an arbitrary 3D shape;
automatically selecting by the processor a plurality of grasp configurations of a robotic hand, the robotic hand comprising a plurality of fingers, each grasp configuration specifying a hand configuration and joint variables of the hand, and contact points for the fingers on the object's surface as so described;
receiving at the processor as an input a coefficient of friction at each of the contact points in the selected grasp configurations;
receiving at the processor as an input as an input a description of a specific external wrench that applies to the object;
computing by the processor a quality measure for each selected grasp configuration representing an ability of the robotic hand to hold the object against the specific external wrench in the selected configuration by solving a force optimization problem;
comparing by the processor the quality measure of each of the selected grasp configurations to determine which selected grasp configurations have the best quality measure;
choosing by the processor one of the selected grasp configurations with the best quality measure; and
controlling by the processor the robotic hand to grasp the object using the chosen grasp configuration by making contact between the object and the fingers of the robotic hand.

38. A method for automatically grasping an object with a desirable precision grasp comprising the steps of:
receiving at a processor as an input a description of the surface of an object, said object being of an arbitrary 3D shape, and said description comprising one or more surface patches, point clouds or polygonal meshes;
automatically selecting by the processor a plurality of grasp configurations of a robotic hand, the robotic hand comprising a plurality of fingers, each grasp configuration specifying a hand configuration and joint variables of the hand, and contact points for the fingers on the object's surface as so described;
receiving at the processor as an input a coefficient of friction at each of the contact points in the selected grasp configurations;
receiving at the processor as an input as an input a description of a specific external wrench that applies to the object;
computing by the processor a quality measure for each selected grasp configuration representing an ability of the robotic hand to hold the object against the specific external wrench in the selected grasp configuration by solving a force optimization problem;
comparing by the processor the quality measure of each of the selected grasp configurations to determine which selected grasp configurations have the best quality measure;
choosing by the processor one of the selected grasp configurations with the best quality measure; and controlling by the processor the robotic hand to grasp the object using the chosen grasp configuration by making contact between the object and the fingers of the robotic hand.

\* \* \* \* \*